United States Patent
Tanaka et al.

(10) Patent No.: US 8,487,950 B2
(45) Date of Patent: Jul. 16, 2013

(54) VIDEO DISPLAY APPARATUS AND METHOD, AND SIGNAL PROCESSING CIRCUIT AND LIQUID CRYSTAL BACKLIGHT DRIVER TO BE BUILT THEREIN

(75) Inventors: Masato Tanaka, Tokyo (JP); Kazuo Asanuma, Tokyo (JP); Mamoru Sakamoto, Tokyo (JP); Yasuo Hosaka, Tokyo (JP); Akinobu Maekawa, Tokyo (JP); Hidehumi Nakagome, Tokyo (JP)

(73) Assignees: Taiyo Yuden Co. Ltd., Tokyo (JP); Microspace Corporation, Tokyo (JP)

( * ) Notice: Subject to any disclaimer, the term of this patent is extended or adjusted under 35 U.S.C. 154(b) by 565 days.

(21) Appl. No.: 12/739,551

(22) PCT Filed: Oct. 27, 2008

(86) PCT No.: PCT/JP2008/069468
§ 371 (c)(1),
(2), (4) Date: Apr. 23, 2010

(87) PCT Pub. No.: WO2009/054527
PCT Pub. Date: Apr. 30, 2009

(65) Prior Publication Data
US 2010/0259689 A1    Oct. 14, 2010

(30) Foreign Application Priority Data
Oct. 26, 2007 (JP) .................. 2007-278630

(51) Int. Cl.
*G09G 5/00* (2006.01)
*G09G 5/02* (2006.01)
*G09G 5/10* (2006.01)
*G09G 3/36* (2006.01)
*H04N 9/64* (2006.01)
*H04N 9/68* (2006.01)
*H04N 9/73* (2006.01)
*H04N 1/46* (2006.01)
*H04N 5/225* (2006.01)
*G06K 9/00* (2006.01)
*G06K 9/40* (2006.01)

(52) U.S. Cl.
USPC .......... 345/589; 345/428; 345/590; 345/204; 345/690; 345/94; 348/185; 348/255; 348/273; 348/534; 348/622; 358/504; 358/512; 358/515; 358/522; 358/448; 382/162; 382/168; 382/254; 382/260; 382/274

(58) Field of Classification Search
USPC ................. 345/428, 581, 589–590, 606–612, 345/616–619, 630, 643, 654, 440–440.1, 345/547–549, 204, 690–691, 207–208, 48–53, 345/55, 58, 63, 87–90, 94; 348/180–181, 348/185–186, 251–255, 256–259, 273, 336, 348/425.2, 465–466, 477, 488, 500, 502, 348/516–522, 528, 533–538, 560, 571, 598–599, 606–607, 622, 630, 668, 671, 674, 348/683, 739–743; 358/504, 512, 515–519, 358/521–522, 525, 533, 446–448, 463; 382/162–163, 167–169, 254, 260–265, 270, 382/274–276, 300
See application file for complete search history.

(56) References Cited

U.S. PATENT DOCUMENTS

| | | | | |
|---|---|---|---|---|
| 4,468,709 A | * | 8/1984 | Kenjyo | 386/203 |
| 4,899,216 A | * | 2/1990 | Tatsumi et al. | 358/521 |
| 5,184,222 A | * | 2/1993 | Yanagisawa | 348/594 |
| 2002/0085120 A1 | * | 7/2002 | Yamaguchi et al. | 348/558 |
| 2005/0104838 A1 | * | 5/2005 | Sasaki | 345/102 |
| 2008/0107360 A1 | * | 5/2008 | Yamashita et al. | 382/313 |

FOREIGN PATENT DOCUMENTS

| | | |
|---|---|---|
| CN | 1379597 | 11/2002 |
| JP | 2000-115795 | 4/2000 |
| JP | 2002-156951 A1 | 5/2002 |
| JP | 2002-258401 A1 | 9/2002 |
| JP | 2002-357810 A1 | 12/2002 |
| JP | 2003-99010 A1 | 4/2003 |
| JP | 2004-85961 A1 | 3/2004 |

| | | | |
|---|---|---|---|
| JP | 2005-99367 A1 | 4/2005 | |
| JP | 2007-17460 A1 | 1/2007 | |
| JP | 2007-36999 A1 | 2/2007 | |

OTHER PUBLICATIONS

International Search Report for International Application No. PCT/JP2008/069468 dated Jan. 21, 2009.

First Office Action received on counterpart application No. 200880113234.X from the State Intellectual Property Office of People's Republic of China dated Feb. 22, 2012 with English translation (5 pages) and First Notice of Examiner's Opinion with English translation (12 pages).

* cited by examiner

*Primary Examiner* — Wesner Sajous

(74) *Attorney, Agent, or Firm* — Kratz, Quintos & Hanson, LLP

(57) ABSTRACT

An overflow suppression technique that is effective for avoiding degradation in image quality is provided. A fundamental waveform and detail is extracted out of an input RGB signal. A suppression gain generation unit 614 generates a suppression gain from the extracted fundamental waveform. Multipliers 612a and 612b multiply the detail and the fundamental waveform by the generated suppression gain, respectively. Then, an adder 626 combines them together for a mixed output. Alternatively, equalization processing is performed as follows. A low frequency component fundamental waveform is obtained as a result of the passing of an input RGB signal through a low pass filter 622. A suppression gain is generated from the low frequency component fundamental waveform. Then, the input itself is multiplied by the suppression gain to obtain an output.

16 Claims, 22 Drawing Sheets

FIG.1
OVERFLOW LIMITER (CONVENTIONAL)
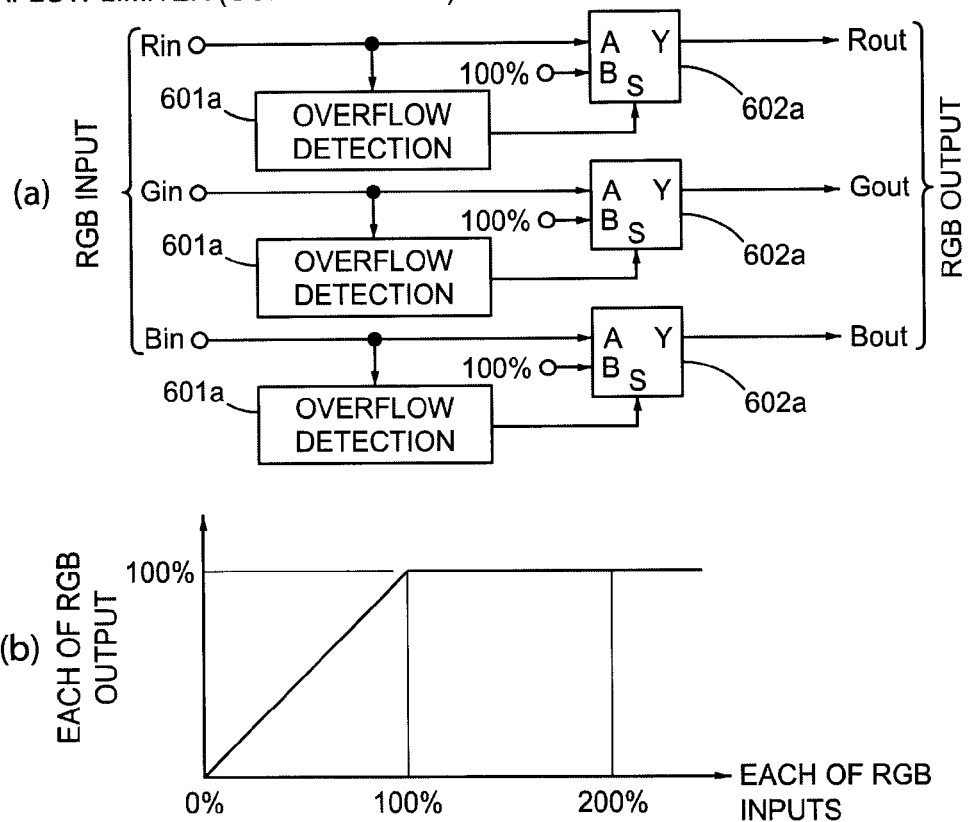
FIG.2 NON-LINEAR GAMMA SUPPRESSOR (CONVENTIONAL)
(a) BLOCK DIAGRAM
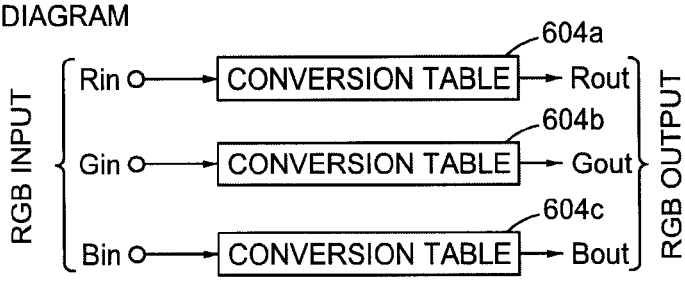
(b) RGB INPUT TO OUTPUT/CHARACTERISTICS
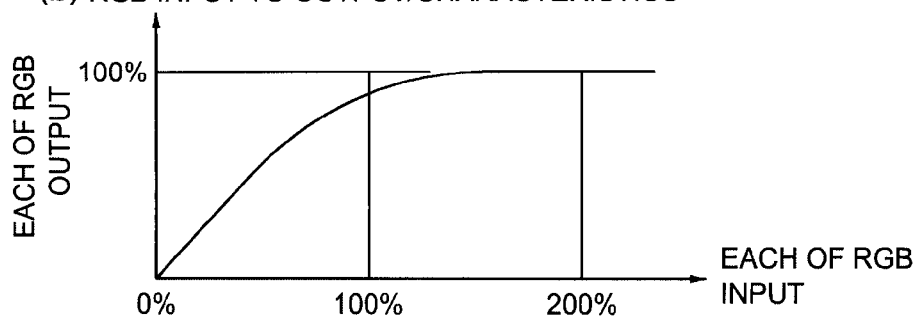

BEHAVIOR OF NON-LINEAR GAMMA SUPPRESSOR
(COLOR BALANCE IS DISRUPTED)

FIRST BALANCED SUPPRESSOR

SUPPRESSION CHARACTERISTICS OF FIRST BALANCED SUPPRESSOR

BEHAVIOR OF FIRST BALANCED SUPPRESSOR
(COLOR BALANCE IS KEPT)

SECOND BALANCED SUPPRESSOR

SUPPRESSION CHARACTERISTICS OF SECOND BALANCED SUPPRESSOR

FIG.9
BEHAVIOR OF BALANCED SUPPRESSOR FOR IMAGE DETAIL
(CONTRAST DECREASES WHEN LEVEL IS HIGH)

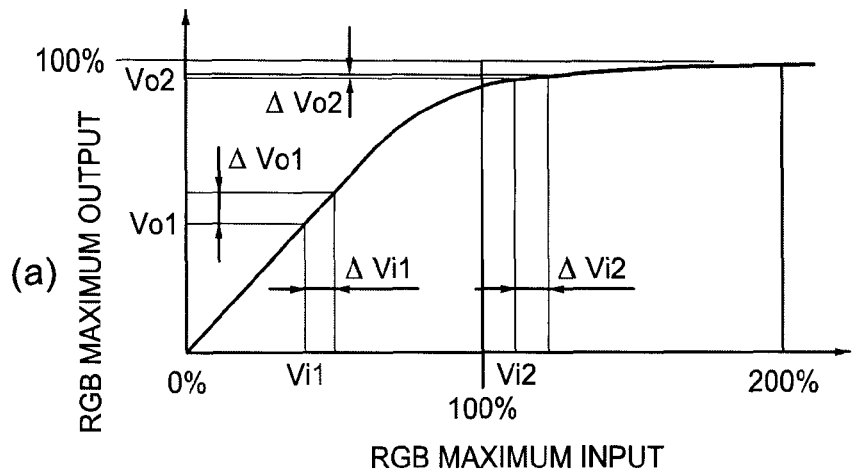

(b) $\quad \dfrac{\Delta Vo2}{\Delta Vi2} \ll \dfrac{\Delta Vo1}{\Delta Vi1} = 1$ FIG.10
OPERATION EXAMPLE OF SECOND BALANCED SUPPRESSOR (COLOR OUTPUT UNFAITHFULNESS FOR AVERAGE COLOR)

(a) TEXTURE WAVEFORM AT SUPPRESSOR INPUT

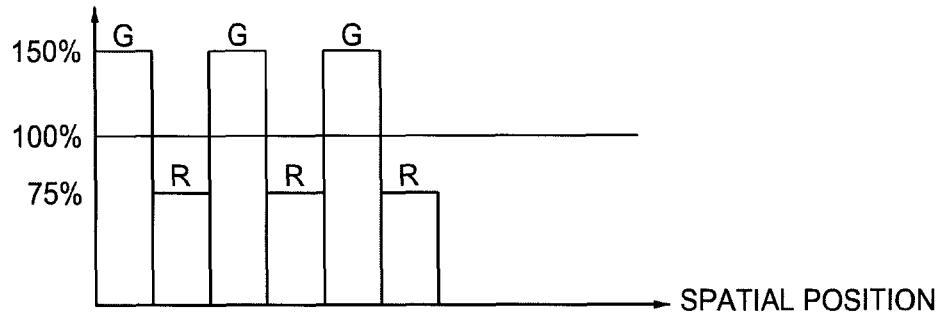

(b) TEXTURE BRIGHTNESS WAVEFORM AT SUPPRESSOR OUTPUT HAVING CHARACTERISTICS SHOWN IN FIG. 8

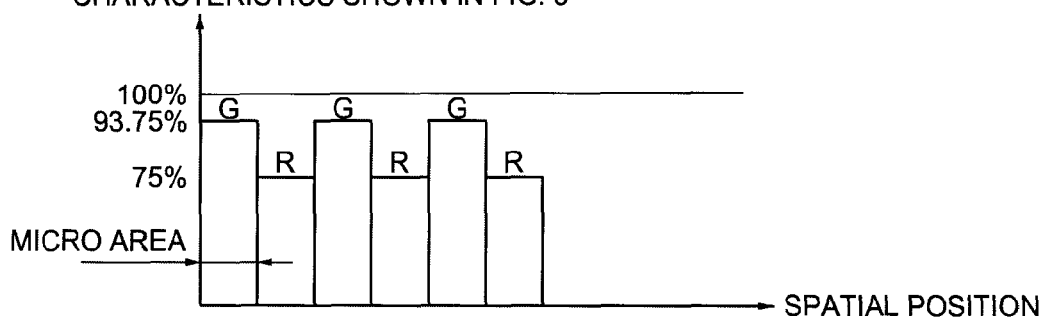

BALANCED SUPPRESSOR TO KEEP DETAILS

BEHAVIOR OF BALANCED SUPPRESSOR TO KEEP DETAILS
(CONTRAST IS KEPT WHEN LEVEL IS HIGH)

(b) $\dfrac{\Delta Vo3}{\Delta Vi3} = \dfrac{\Delta Vo2}{\Delta Vi2} = \dfrac{\Delta Vo1}{\Delta Vi1} = 1$ (c) $\dfrac{\Delta Vo1}{\Delta Vi1} = \dfrac{\Delta Vo1}{\Delta Vi1} = 1$   (d) $\dfrac{\Delta Vo3}{\Delta Vi3} = 1 > \dfrac{Vo3}{Vi3}$

BALANCED SUPPRESSOR TO KEEP DETAIL IN ORIGINAL PROPORTIONS

BEHAVIOR OF BALANCED SUPPRESSOR TO KEEP DETAIL IN ORIGINAL PROPORTIONS
(CONTRAST REMAINS UNCHANGED WHEN LEVEL IS HIGH)

(b) $\dfrac{\Delta Vo3}{\Delta Vi3} = \dfrac{Vo3}{Vi3}$ , $\dfrac{\Delta Vo1}{\Delta Vi1} = \dfrac{Vo1}{Vi1}$

BALANCED SUPPRESSOR HAVING NOISE SUPPRESSION CHARACTERISTICS WHEN LEVEL IS LOW

NOISE SUPPRESSION CURVE EXAMPLE

BALANCED SUPPRESSOR HAVING NOISE SUPPRESSION
CHARACTERISTICS WHEN DETAIL IS SMALL

EXAMPLE OF NOISE SUPPRESSION NON-LINEAR CHARACTERISTICS

FIG. 19
TWO-DIMENSIONAL BALANCED SUPPRESSOR
TO KEEP DETAIL IN ORIGINAL PROPORTIONS
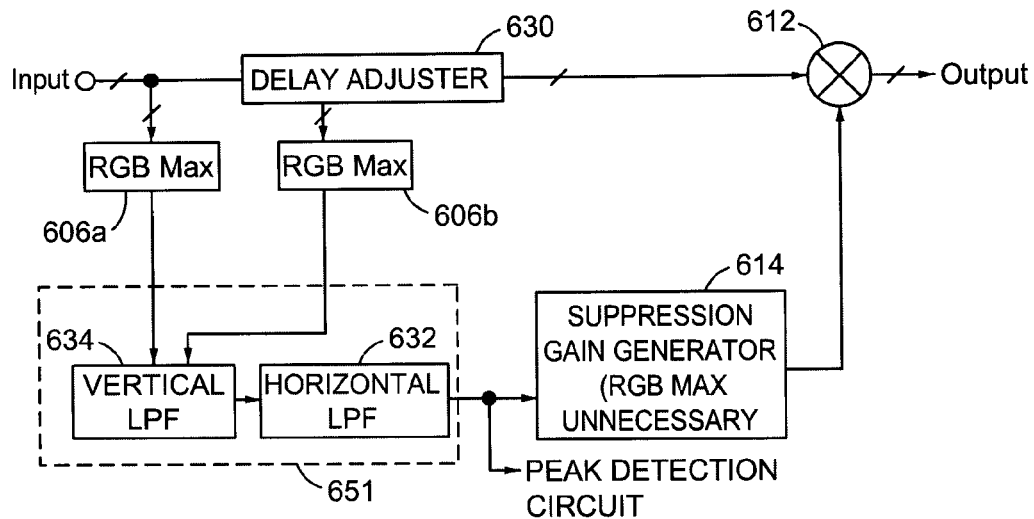
FIG. 20
LPF EXAMPLE
(a) HORIZONTAL LPF
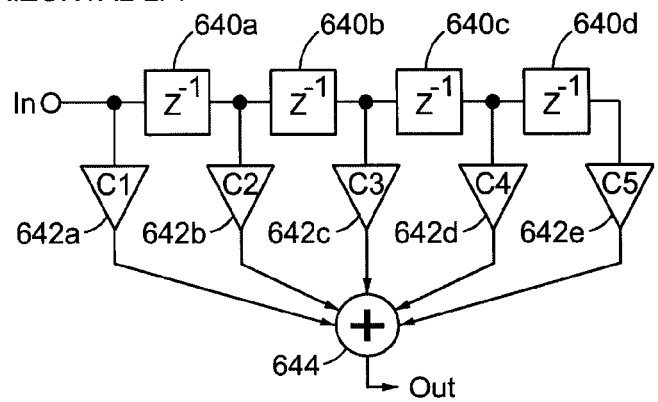
(b) ACTUAL CONFIGURATION EXAMPLE OF HORIZONTAL LPF
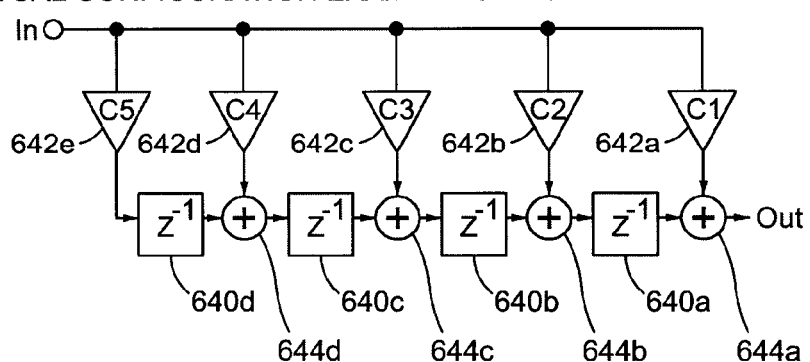

EXAMPLE OF VERTICAL LPF

FIR-IIR CASCADED VERTICAL LPF

IMPULSE RESPONSE OF FIR-IIR CASCADED VERTICAL LPF

FIR-IIR PARALLELED VERTICAL LPF

FIG. 25
IMPULSE RESPONSE OF FIR-IIR PARALLELED VERTICAL LPF
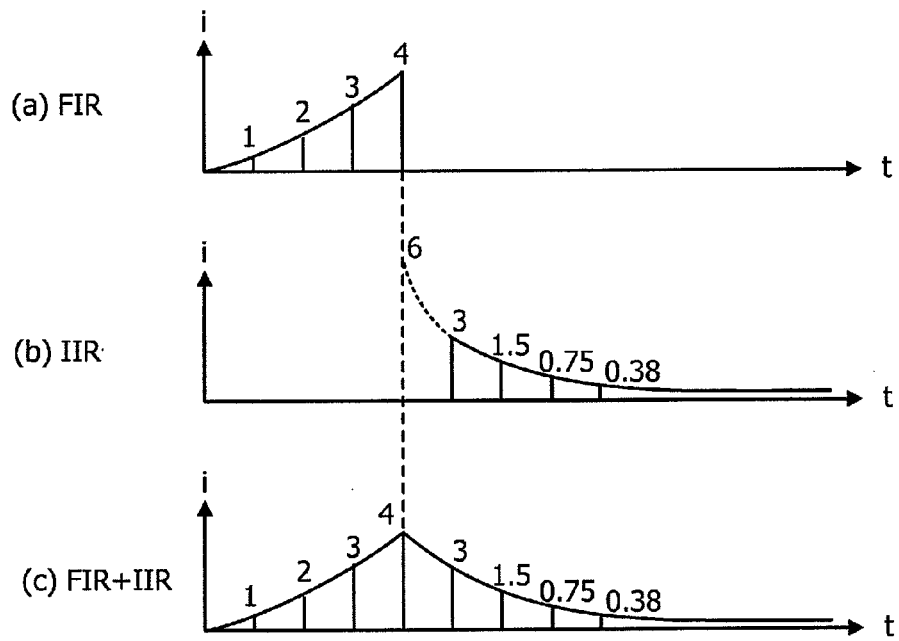
FIG. 26
FIRST EXAMPLE OF MAXIMUM VALUE FILTER
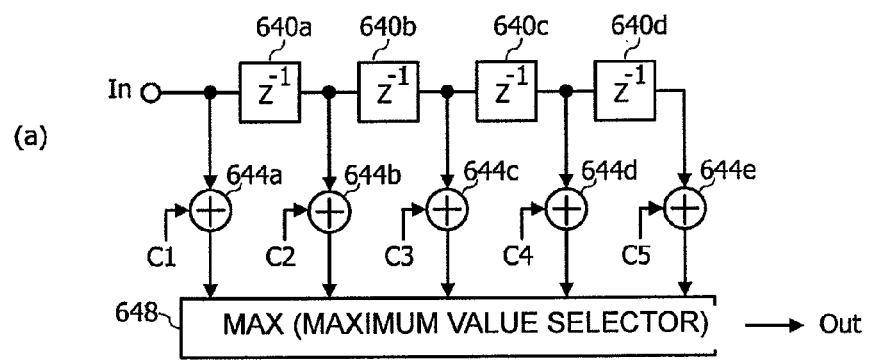
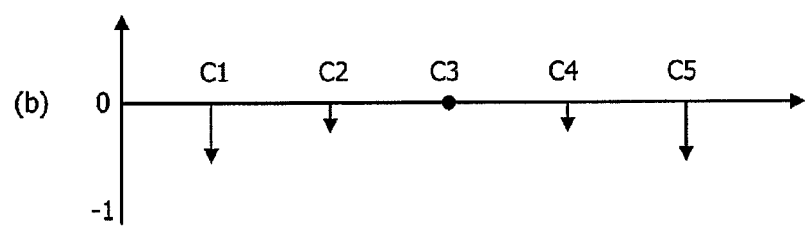

FIG. 27
SECOND EXAMPLE OF MAXIMUM VALUE FILTER
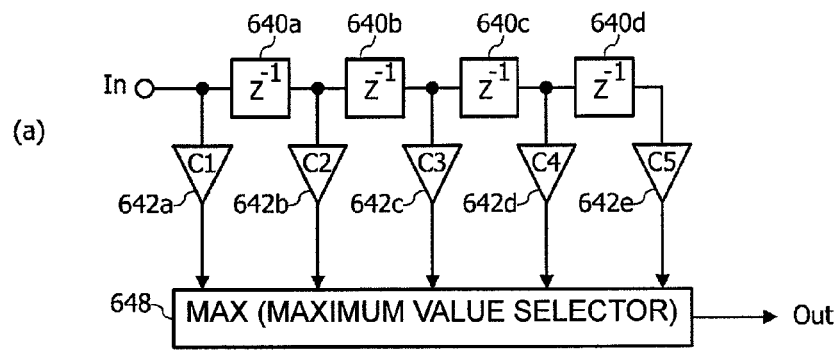
(b)
WEIGHT COEFFICIENT VALUE
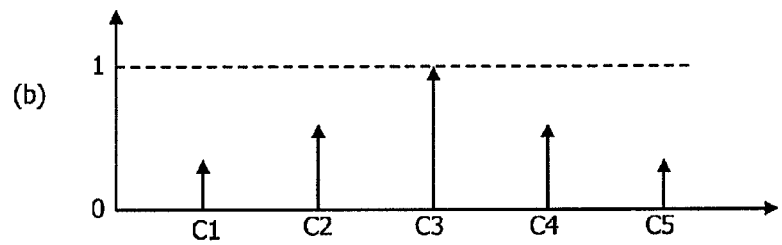
FIG. 28
ANOTHER EXAMPLE OF DETAIL-KEEPING LPF
(a)
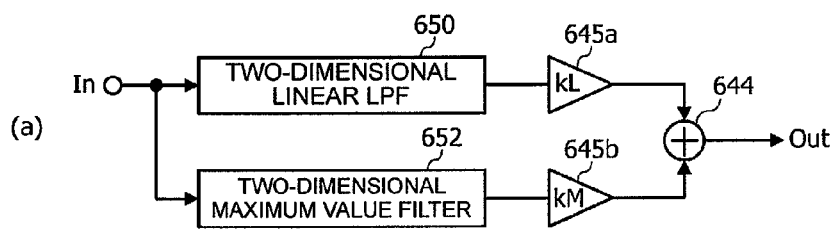
(b)
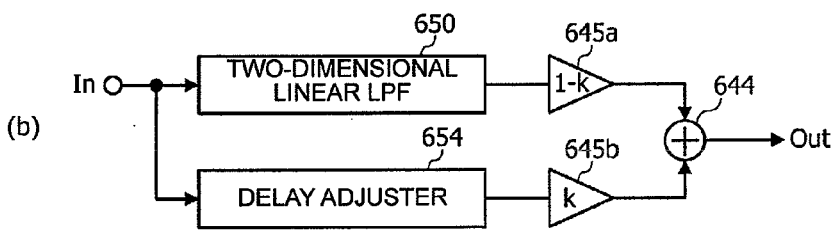
(c) RESPONSE GAIN
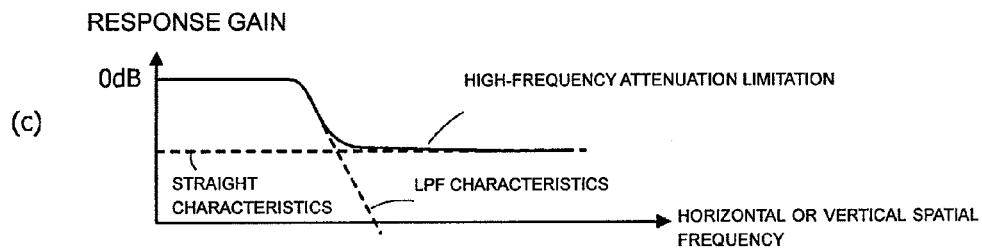

SUPPRESSION CHARACTERISTICS

SUPPRESSION CHARACTERISTICS OF VARIABLE SUPPRESSOR 2

SUPPRESSION CHARACTERISTICS OF VARIABLE SUPPRESSOR 3

(a) GT (b) VD (c) VO

SMALLER GAINS PRIORITY COMBINER

DETAIL UPPER-LIMIT LIMITATION

DETAIL MARGIN APPROXIMATE SIGNAL

VIDEO DISPLAY APPARATUS AND METHOD, AND SIGNAL PROCESSING CIRCUIT AND LIQUID CRYSTAL BACKLIGHT DRIVER TO BE BUILT THEREIN

TECHNICAL FIELD

The present invention generally relates to a lamp driving control apparatus, its method, and a signal processing circuit and a liquid crystal backlight driver that are to be built therein. In particular, the invention relates to a technique that is effective for improving image quality and reducing power consumption.

BACKGROUND ART

As a technique for improving the moving picture display performance of a liquid crystal display device such as an LCD TV, a method of segmenting a liquid crystal backlight source into a plurality of blocks and controlling the timing of lighting for each segment block has been studied. For example, such a technique is disclosed in the following publication.

Patent Document 1: Japanese Unexamined Patent Application Publication No. 2005-99367

As illustrated in FIG. 1, the patent document 1 discloses a configuration in which driving circuits 28 to 31 independently drive backlights 32 to 35, which are segmented in four blocks, respectively.

As a technique for reducing the power consumption of a liquid crystal display device, a control method called as APL-AGC (Average Picture Level Automatic Gain Control) is known. In APL-AGC, the brightness of backlight is controlled depending on average video brightness. For example, such a technique is disclosed in the following publications.

Patent Document 2: Japanese Unexamined Patent Application Publication No. 2002-156951

Patent Document 3: Japanese Unexamined Patent Application Publication No. 2002-258401

Patent Document 4: Japanese Unexamined Patent Application Publication No. 2002-357810

Patent Document 5: Japanese Unexamined Patent Application Publication No. 2004-085961

The following methods are known as a preventive measure against signal overflow when one or more gains are applied to a video signal for, for example, securing sufficient lightness per power consumption or adjusting lightness.

FIG. 1 is a diagram that schematically illustrates a first example of a conventional preventive measure against overflow. As illustrated in FIG. 1(a), in this example, an overflow detection circuit 601 and a multiplexer 602 make up an overflow limiter, which clips an input value that is larger than the maximum output value (a region greater than 100% in the horizontal axis of FIG. 1(b)) into the maximum output value (100% in the vertical axis of FIG. 1(b)) independently for each of R, G, and B.

FIG. 2 is a diagram that schematically illustrates a second example of a conventional preventive measure against overflow. As illustrated in FIG. 2(a), in this example, gamma correction characteristics are applied to each of RGB using conversion tables 604a, 604b, 604c. As illustrated in FIG. 2(b), a change in output relative to a change in input gradually decreases as it approaches overflow. A non-linear gamma suppressor is configured so that, while maintaining monotonic increase continuously, it is ensured that the output level should fall within the maximum output range.

According to these methods, however, different gains are controlled independently for RGB. Except for white, which is a color in which the levels of RGB are equal to one another by nature, a reproduced color will not be faithful to the original color if any of RGB becomes saturated or if its gain decreases, that is color shift.

When the greatest level component of RGB becomes saturated first, a color shifts toward the remaining components. Then, when the second greatest level component becomes saturated, the color shifts toward white, that is, in the direction in which the color becomes faint.

FIG. 3 is a diagram that schematically illustrates an example of the disruption of a color balance that occurs when the non-linear gamma suppressor illustrated in FIG. 2 is employed. Flesh color having a color ratio of R:G:B=4:3:2 is taken as an example. As illustrated in the drawing, in a region where an input level is low, an output level increases while keeping the ratio of 4:3:2 (refer to points "a" and "b" in the drawing). As the input level comes close to 100% with increasing suppression, the R component becomes saturated first, which causes the color to shift toward yellow (refer to a point "c"). As lightness further increases, the G component becomes saturated next. As G becomes saturated, the color shifts toward white (refer to a point "d"). When a color shift toward white occurs in a flesh-color region, it means that the color shifts in a complementary-color direction for flesh color. As a result, the color does not look white but it looks to have a tinge of aqua blue, which results in a very unnatural picture.

Even when an original color is white, the values of RGB will be slightly different from one another due to white balancing and/or color temperature adjustment. In such a case, when a level enters a saturation region or other non-linear region, a white balance at a highlight peak part becomes disrupted. Even if a white balance is in an off-balance state as a whole in a certain direction, it is difficult for an observer to visually recognize the off-balance state unless a comparative screen picture is displayed adjacent to an off-balance picture at the same time because human eye adapts to such an off-balance state. However, when there are originally white regions whose lightness only is different from one another, such regions as shades of a snowy landscape or shades of a white shirt, even a slight disruption in a white balance makes these regions having different lightness conspicuously unnatural.

As described above, a means for preventing overflow could exert adverse effects on an image. However, to obtain lightness per power consumption as great as possible and reduce power consumption, there is a demand for a technique for effectively avoiding degradation in image quality even under considerable overflow and thereby offering more natural video display.

DISCLOSURE OF INVENTION

Problems to be Solved by the Invention

In view of the foregoing, the present invention provides an overflow suppression technique that is effective for avoiding degradation in image quality.

Means for Solving the Problems

To solve the above problem, the invention in a first aspect is: a video display apparatus that performs video display by controlling display elements on the basis of a video signal composed of a plurality of primary color signals, including: means for detecting a maximum value of each of the primary color signals; means for generating a suppression gain on the basis of the maximum value; means for applying the suppression gain to each of the primary color signals; and means for controlling the display elements on the basis of the primary color signals after the application of the suppression gain.

According to the invention of the first aspect, since the same suppression gain is applied to each primary color, the level of a signal outputted to display elements can be suppressed while keeping a primary-color ratio. Therefore, color output unfaithfulness does not occur at a suppressed region. A white balance is not disrupted even at a region where an output is saturated.

The primary color signals making up the video signal may correspond to basic three primary colors of red (R), green (G), and blue (B). Or, the invention can be applied to three primary colors other than red, green, and blue, four primary colors, or six primary colors. Further, the display elements to which the invention is directed are applicable to a direct-view-type LCD TV, a projector, a transmissive or reflective light-source-modulation-type display device such as a rear projector, and a self-emission display device such as CRT, plasma display, EL, and FED (Field Emission Display).

Moreover, the present invention can be combined with cooperative control of backlight and liquid crystal or with APL-AGC. The term "cooperative control of backlight and liquid crystal" means control of decreasing backlight brightness as video input peak brightness or input average brightness decreases, and in addition, increasing the degree of liquid crystal modulation as the backlight brightness decreases. With such control, it is possible to save power in a dark scene without a perceptible video change. The number of tones in a dark part increases because of the increased liquid crystal modulation gain. Black can be reproduced deeply because of the decreased backlight brightness. Therefore, the above control improves dark-part contrast. The gain of video display brightness as a combination of backlight and liquid crystal is mathematically expressed as a product of backlight brightness and a liquid crystal modulation gain. This value is kept constant so as not to give a sense of unnaturalness to an observer due to a change in display brightness.

The invention in a second aspect is: a video display apparatus that performs video display by controlling display elements on the basis of a video signal composed of a plurality of primary color signals, including: means for separating each of the primary color signals into a fundamental waveform and a detail waveform; means for generating a suppression gain on the basis of the fundamental waveform; means for applying the suppression gain to each of the primary color signals included in the fundamental waveform; means for mixing each of the primary color signals after the application of the suppression gain with the detail waveform; and means for controlling the display elements on the basis of a signal obtained as a result of the mixing.

According to the invention of the second aspect, after separation into a fundamental waveform and a detail waveform and suppressing the fundamental waveform, they are mixed again. Since detail information is retained, contrast will be kept even at a high level region. Therefore, it is possible to compress a dynamic range without impairing texture and three-dimensional appearance. Moreover, when combined with cooperative control of backlight and liquid crystal, it is possible to greatly improve contrast at a dark part.

A low pass filter can be used for separation into a fundamental waveform and a detail waveform. The low pass filter is not limited to a linear arithmetic filter. It may be a logical filter such as a mode filter or a rank order filter.

When a maximum value of primary color signals is detected for generating a suppression gain, the maximum value may be detected first before it passes through the low pass filter. Or, each primary color signal may be supplied to the low pass filter, followed by detection of a maximum value from the output of the low pass filter. The low pass filter and a maximum value detection circuit may be configured as a single unit.

An overflow limiter may be additionally provided downstream of the mixer of a fundamental waveform and a detail waveform after suppression. The overflow limiter may be an RGB-independent limiter or a balanced suppressor having limiter characteristics according to the present invention.

The invention in a third aspect is: a video display apparatus that performs video display by controlling display elements on the basis of a video signal composed of a plurality of primary color signals, including: means for separating each of the primary color signals into a fundamental waveform and a detail waveform; means for generating a suppression gain on the basis of the fundamental waveform; means for applying the suppression gain to each of the primary color signals before the separation; and means for controlling the display elements on the basis of a signal after the application of the suppression gain.

According to the invention in the third aspect an output with detail information being retained can be obtained without using a detail signal side. Therefore, it offers the same or similar advantage as that of the invention recited in the second aspect with a simple configuration.

The invention in a fourth aspect is characterized in that, in the invention recited in the second aspect, the means for separating the primary color signals into the fundamental waveform and the detail waveform includes a two-dimensional filter that extracts the fundamental waveform containing both a horizontal direction component and a vertical direction component of the video signal and means for subtracting the fundamental waveform extracted by the two-dimensional filter from the video signal.

According to the invention in the fourth aspect, a fundamental waveform is extracted by means of a two-dimensional low pass filter. Then, it is subtracted from the original input to extract detail information in all vertical-horizontal directions. Thus, detail can be reproduced with greater accuracy.

The invention in a fifth aspect is: a video display apparatus that performs video display by controlling display elements on the basis of a video signal composed of a plurality of primary color signals, including: means for separating each of the primary color signals into a fundamental waveform and a detail waveform; means for generating a suppression gain on the basis of the fundamental waveform; means for applying the suppression gain to each of the fundamental waveform and the detail waveform; means for mixing the fundamental waveform after the application of the suppression gain with the detail waveform after the application of the suppression gain; and means for controlling the display elements on the basis of a signal obtained as a result of the mixing.

According to the invention in the fifth aspect, since the same gain is applied to both a fundamental waveform and a detail waveform, a differential gain will be equal to an average gain even at a high level region. Therefore, it is possible to prevent contrast from changing when the level is high and compress a dynamic range without impairing texture and three-dimensional appearance. Moreover, when combined with cooperative control of backlight and liquid crystal, it is possible to greatly improve contrast at a dark part.

The following methods can be used for applying the same gain to both a fundamental waveform and a detail waveform. After the generation of a suppression gain from a fundamental waveform, the fundamental waveform and a detail waveform are multiplied by the suppression gain. Or, as equalization processing, a low frequency component fundamental waveform is obtained by passing an input video signal through a low pass filter; a suppression gain is generated from the low frequency component fundamental waveform; then, the input itself is multiplied by the suppression gain to obtain an output. Or, an RGB-independent fundamental waveform is extracted out of input RGB by means of a low pass filter, followed by multiplication of the input RGB by a suppression gain generated from the fundamental waveform.

The invention in a sixth aspect is: a video display apparatus that performs video display by controlling display elements on the basis of a video signal composed of a plurality of primary color signals, including: means for separating each of the primary color signals into a fundamental waveform and a detail waveform; means for applying noise suppression characteristics for lowering a gain of the detail waveform when a level of the detail waveform or the video signal is low; means for generating a suppression gain on the basis of the fundamental waveform; means for applying the suppression gain to the fundamental waveform and/or the detail waveform; means for mixing the fundamental waveform after the application of the suppression gain with the detail waveform after the application of the noise suppression characteristics; and means for controlling the display elements on the basis of a signal obtained as a result of the mixing.

According to the invention in the sixth aspect, the gain of a detail waveform is lowered when the level is low. Therefore, since noise, especially quantization noise and video compression noise, is suppressed, it is possible to avoid dark-part noise from being emphasized even when dark-part contrast improves with dynamic range compression or cooperative control of backlight and liquid crystal.

The input level for applying noise suppression characteristics may be extracted out of a detail waveform or out of an original signal supplied to a means for varying a gain such as peak AGC.

The invention in a seventh aspect is: a video display apparatus that performs video display by controlling display elements on the basis of a video signal composed of a plurality of primary color signals, including: means for separating each of the primary color signals into a fundamental waveform and a detail waveform; means for applying dead-zone characteristics for lowering a gain when a level is low to the detail waveform; means for generating a suppression gain on the basis of the fundamental waveform; means for applying the suppression gain to the fundamental waveform and/or the detail waveform; means for mixing the fundamental waveform after the application of the suppression gain with the detail waveform after the application of the dead-zone characteristics; and means for controlling the display elements on the basis of a signal obtained as a result of the mixing.

According to the invention in the seventh aspect, dead-zone characteristics are applied to a detail waveform. By this means, a minute detail signal is masked, which results in suppression of noise, especially quantization noise. Therefore, it is possible to avoid dark-part noise from being emphasized even when dark-part contrast improves with dynamic range compression or cooperative control of backlight and liquid crystal.

The invention in a eighth aspect is characterized in that, in the invention recited in the fourth aspect, the two-dimensional filter includes a vertical filter for operating the vertical direction component; and the vertical filter includes an FIR filter and an IIR filter that are connected in cascade or in parallel.

The invention in a ninth aspect is characterized in that, in the invention recited in the fourth aspect, the two-dimensional filter includes a vertical filter for operating the vertical direction component and a horizontal filter for operating the horizontal direction component; and at least one of the vertical filter and the horizontal filter is a logical filter that includes maximum value selecting means.

The invention in a tenth aspect is characterized in that, in the invention recited in the fourth aspect, the two-dimensional filter includes means for mixing an output of a linear low pass filter and an output of a logical filter that includes maximum value selecting means.

The invention in an eleventh aspect is characterized in that, in the invention recited in the fourth aspect, the two-dimensional filter includes means for mixing an output of a linear low pass filter and an output of a delay adjustment circuit that allows an input to pass through as it is.

The invention in a twelfth aspect is: a video display apparatus that performs video display by controlling light emitted from a light source on the basis of an input video signal by means of a plurality of display elements, including: means for separating the video signal into a fundamental waveform and a detail waveform; means for detecting a brightness peak of the video signal; means for detecting an error with respect to a target value of the brightness peak; means for determining a modulation gain of the display elements on the basis of the error; means for controlling amount of light emitted from the light source through inverse compensation of the error; means for generating a suppression gain on the basis of the modulation gain and a level of the video signal; means for applying the suppression gain to the video signal; and means for controlling the display elements on the basis of a video signal after the application of the suppression gain.

The invention in a thirteenth aspect is characterized in that, in the invention recited in the twelfth aspect, the means for generating the suppression gain includes means for mix-outputting a plurality of suppress curves prepared in advance depending on the modulation gain.

The invention in a fourteenth aspect is characterized in that, in the invention recited in the twelfth aspect, the means for generating the suppression gain includes means for comparing a suppress curve prepared in advance with the modulation gain and selectively outputting the smaller one found as a result of the comparison.

The invention in a fifteenth aspect is: a video display apparatus that performs video display by controlling display elements on the basis of a video signal composed of a plurality of primary color signals, including: means for separating each of the primary color signals into a fundamental waveform and a detail waveform; means for generating a suppression gain on the basis of the fundamental waveform; means for mixing the fundamental waveform after application of the suppression gain with the detail waveform; means for detecting a level of the detail waveform; means for limiting an output level after the mixing either directly or indirectly on the basis of the detected level of the detail waveform; and means for controlling the display elements on the basis of the output after the mixing.

The invention in a sixteenth aspect is characterized in that, in the invention recited in the fifteenth aspect, the fundamental waveform is executed by a low pass filter; and the means for limiting the output level limits an upper limit of the detail waveform depending on a saturation margin of a signal outputted from the low pass filter.

The invention in a seventeenth aspect is characterized in that, in the invention recited in the fifteenth aspect, the fundamental waveform is executed by a low pass filter; and the means for limiting the output level limits an upper limit of the detail waveform using an input signal and an output signal of the low pass filter.

Advantages

As explained above, according to an aspect of the invention, the level of a signal outputted to display elements can be suppressed while keeping a primary-color ratio. Therefore, color output unfaithfulness does not occur at a suppressed region. A white balance is not disrupted at a region where an output is saturated.

BEST MODES FOR CARRYING OUT THE INVENTION

With reference to the accompanying drawings, exemplary embodiments of the present invention will now be explained in detail. The scope of the invention is not limited to the following embodiments. It can be modified where appropriate.

FIG. 4 is a circuit block diagram that illustrates the configuration of a balanced suppressor according to a first embodiment of the invention. As illustrated in FIG. 4, a balanced suppressor 624 is provided between, for example, a video processing unit 700, which performs predetermined processing on a video signal, and display elements 702 such as liquid crystal. The balanced suppressor 624 has a function of suppressing the output level of a video signal before it is inputted into the display elements 702. Notwithstanding the above, the balanced suppressor 600 and the video processing unit 700 may be configured as a single unit. In the drawing, each signal line that is shown with a sign "/" indicates a line that is provided individually for each of R, G, and B. Each signal line that is shown without the sign "/" indicates a line other than the line provided individually for each of RGB; or the signal line shown without the sign "/" indicates a line that may either be provided individually for each of RGB or not. The same denotation is used also for other drawings that will be referred to in the following description.

A maximum value detection circuit 606 detects a maximum value of input RGB (Input [0-200%]). A suppression gain generation unit 614, which includes the maximum value detection circuit 606, a digit shifter 608, and a subtracter 610, generates a "suppression gain" (Gain [100% -50%]) as a function of the maximum value. The suppression gain monotonically decreases in a continuous manner at a region as an input level is higher. A multiplier 612 multiplies the input RGB by the suppression gain to generate an output (Output [0-100%]) of a non-linear curve that monotonically increases in relation to an input level and falls within a range where saturation does not occur. That is, unlike the conventional saturation control in which different gains are controlled independently for RGB, the same gain is applied to each color component for saturation-preventive control. By this means, it is possible to avoid a phenomenon of color output lacking faithfulness to the original color, that is color shift, which occurs in prior art.

FIG. 5 is a characteristics diagram that illustrates an example of a suppression characteristics of the balanced suppressor illustrated in FIG. 4. As shown by a dotted line in FIG. 5, a gain of 50to 100% is generated at the suppression gain generation unit 614 shown in FIG. 4 on the basis of an input value. The multiplier 612 gives inverted-parabolic-curve suppression characteristics shown by a solid line in FIG. 5 thereto.

FIG. 6 is a characteristics diagram that illustrates an example of the behavior of the balanced suppressor illustrated in FIG. 4. Since the balanced suppressor applies the same gain to R, G, and B, as shown at the points a and b in FIG. 6, the ratio of these color components remains unchanged even when the maximum RGB input increases. Therefore, color output unfaithfulness does not occur at a suppressed region. A white balance is not disrupted at a region where an output is saturated. For this reason, unlike the conventional art example, a high brightness region of flesh color does not shift into white or aqua blue. A highlight part of white in a snow scene does not turn into aqua blue or pink due to a white balance disruption.

FIG. 7 is a circuit block diagram that illustrates an example of the configuration of a balanced suppressor according to a second embodiment of the invention. The balanced suppressor is able to switch between a plurality of suppression gains depending on an input level. The maximum value detection circuit 606 extracts a maximum value of one signal out of inputs of R, G, and B. The maximum value is inputted into a multiplexer 602 and digit shifters 608a and 608b. The maximum value is attenuated at the digit shifter 608a by a factor of ½, followed by subtraction from 137.5% by a subtracter 610a. The result of subtraction is inputted into the multiplexer 602.

In like manner, the maximum value is attenuated at the digit shifter 608b by a factor of ¼, followed by subtraction from 100% by a subtracter 610b. The result of subtraction is inputted into the multiplexer 602. A level judgment circuit 616 judges the level of the maximum value among the inputs of R, G and B. As illustrated in the drawing, the level judgment circuit 616 outputs a judgment result to the multiplexer 602 according to three ranges, that is, 75% or less, 75 to 150%, and 150% or greater. The multiplexer 602 generates a suppression gain on the basis of the three-line inputs and the output of the level judgment circuit 616 explained above. The suppression gain is inputted into the multiplier 612.

FIG. 8 is a characteristics diagram that illustrates an example of the operation of the balanced suppressor illustrated in FIG. 7. As illustrated in FIG. 8, the suppression gain generated by the suppression gain generation unit 614 shown in FIG. 7 exhibits broken line approximation that depends on an input level. Suppression characteristics approximate to plural inverted parabolic curves at a high level region only; in a region up to an input level of 0.75 full scale, response is linear with a gain of 1.

Though the above characteristics prevent the occurrence of color output unfaithfulness, the fact remains that saturation characteristics are gentle. Therefore, at a region close to saturation, the ratio of an output change to an input change, that is, a differential gain, decreases by a far larger amount than a suppression gain. For this reason, a detail signal, which is a minute change component of an originally light part, will be lost, which causes detail contrast to decrease. Therefore, texture and three-dimensional appearance will be impaired to a large degree.

FIG. 9 is a characteristics diagram that illustrates a decrease in contrast that arises when the level is high with the balanced suppressor illustrated in FIG. 4 or FIG. 7 being used (behavior of balanced suppressor for image detail). As illustrated in FIG. 9($a$), the ratio of an output change $\Delta Vo1$ to an input change $\Delta Vi1$ at a low level region, which is not close to saturation, is 1. The ratio of an output change $\Delta Vo2$ to an input change $\Delta Vi2$ at a region that is close to saturation is far smaller than the first-mentioned ratio. The formula in FIG. 9($b$) expresses the above relationship in mathematical form.

Since each of the above balanced suppressors keeps the ratio of primary color components of each pixel unchanged, as explained above, color output unfaithfulness does not occur at all when observed on a pixel-by-pixel basis. Therefore, if an original picture pattern is expressed as smooth shading of a uniform color, color output unfaithfulness does not occur even when observed as a whole. However, even when the balanced suppressor is used, color output unfaithfulness could occur if there is a dense part in which color differs from one pixel to another or from one micro area (range) to another. For example, when there is a fine texture such as a fabric woven from a plurality of colored threads, since lightness can be varied from one pixel to another or from one micro area to another though the ratio of color components of each pixel remains unchanged, the ratio of relative lightness of the micro areas does change. Since the lightness ratio changes, the mixture ratio of the color components changes on average when observed from a distance, thereby causing color output unfaithfulness.

FIG. 10 is a diagram that illustrates how color output unfaithfulness on average color occurs in a case where there is a texture of different colors when the balanced suppressor illustrated in FIG. 7 is used. In the illustrated example, micro areas of the G component only and micro areas of the R component only are arranged alternately with the same area ratio, which makes it easiest to understand the concept described herein. FIG. 10(a) shows a waveform for an alternate array texture that is made up of micro areas in which the level of the G component is 150% whereas the level of each of the R and B components is 0% and micro areas in which the level of the R component is 75% whereas the level of each of the G and B components is 0%. In other words, FIG. 10(a) shows a waveform for a texture that is made up of an alternate array of bright green as a plain color and darker red as another plain color.

FIG. 10(b) shows a waveform obtained when the waveform shown in FIG. 10(a) is processed by means of the balanced suppressor having the suppression characteristics shown in FIG. 8. Each of G micro areas is suppressed into a micro area in which the level of the G component is 93.75% whereas the level of each of the R and B components is 0%. In each of R micro areas after suppression processing, the level of the R component is 75% whereas the level of each of the G and B components is 0%. Color output unfaithfulness does not occur in the suppression for each of individual plain-color micro areas. However, since the relative original signal levels of the micro areas are different, the suppress ratio differs between the micro areas. Therefore, when the texture made up of an alternate array of these micro areas is observed from a distance on average, an average G level, an average R level, and an R/G ratio of the waveform before the suppression shown in FIG. 10(a) are 75%, 37.5%, and 0.5, respectively, whereas an average G level, an average R level, and an R/G ratio of the waveform after the suppression shown in FIG. 10(b) are 46.875%, 37.5%, and 0.8, respectively, which indicates an increase in the R/G ratio. For this reason, the average color after the suppression has shifted in a direction of increasing the R component relatively as compared with the average color before the suppression. That is, the color shifts from original yellow green toward yellow.

FIG. 11 is a circuit block diagram that illustrates an example of the configuration of a balanced suppressor to keep details according to first, second, and third embodiments of the invention. Each of these suppressors is configured to perform suppression processing while keeping the level of a detail signal.

FIG. 11(a) shows a detail keep balanced suppressor according to the first embodiment of the invention, which is configured to separate the waveform of an input RGB signal into a fundamental waveform and a detail waveform by means of a high pass filter 620 and a low pass filter 622.

The fundamental waveform extracted by the low pass filter 622 is supplied to the balanced suppressor 624. After passing through the balanced suppressor 624, the fundamental waveform is mixed with the detail waveform extracted by the high pass filter 620 with delay time synchronization. The low pass filter 622 is not limited to a linear low pass filter (arithmetic low pass filter). It may be a logical filter such as a rank order filter or a mode filter that takes, for example, a medium value of values inclusive of preceding and succeeding words, the maximum value, or the like.

FIG. 11(b) shows a detail keep balanced suppressor according to the second embodiment of the invention. Functioning as a substitute for the high pass filter 620 illustrated in FIG. 11(a), the subtracter 610 extracts a detail component by subtracting a fundamental wave component extracted by the low pass filter 622 from an input RGB signal. A delay adjustment circuit 623 adjusts the delay time of each signal component inputted into the subtracter 610.

FIG. 11(c) shows a detail keep balanced suppressor according to the third embodiment of the invention, which includes an overflow limiter 628 in addition to the configuration illustrated in FIG. 11(b). The overflow limiter 628 is provided for the purpose of preventing the overflow of a mixed signal that is made up of a detail signal and a fundamental wave signal.

A configuration in which limiter processing is performed for each of R, G, and B independently after the mixing of a fundamental waveform and a detail waveform or a configuration in which a balanced suppressor having limiter characteristics or other characteristics equivalent to or close to the limiter characteristics, that is, a balanced limiter, performs processing thereon after the mixture can be adopted for the overflow limiter 628. Since the detail waveform includes a high-frequency AC signal component only, continuous saturation in a large area does not occur. In addition, its amplitude is not so large. Therefore, it is not always necessary to provide a balanced limiter. Depending on the design specification of the saturation margin of an original balanced suppressor output, a simple RGB-independent overflow limiter may suffice.

FIG. 12 is a characteristics diagram that illustrates an example of the behavior of the detail keep balanced suppressor illustrated in FIG. 11. The detail keep balanced suppressor is configured to suppress a fundamental wave while leaving detail, thereby ensuring that a differential gain is constant at every point as shown in FIG. 12(a) and (b) ($\Delta Vo3/\Delta Vi3 = \Delta Vo2/\Delta Vi2 = \Delta Vo1/\Delta Vi1$). With such a configuration, it is possible to keep contrast even when the level is high because a detail component remains without being suppressed.

As illustrated in FIG. 12(c), the inclination of a differential gain $\Delta Vo1/\Delta Vi1$ is equal to the inclination of an average gain $Vo1/Vi1$ at a low level region, which is not close to saturation. In contrast, as illustrated in FIG. 12(d), the inclination of a differential gain $\Delta Vo3/\Delta Vi3$ is not equal to the inclination of an average gain $Vo3/Vi3$ at a high level region, which is close to saturation.

This means that the following problem will arise if the above processing is merely performed without any additional measures. The suppress average gain of a fundamental waveform obtained as a result of the passing of an input through a low pass filter, that is, the inclination of a straight line shown by a dotted line in FIG. 12 that goes from the origin where the input/output level is zero to the point of each instantaneous input/output level, is smaller than one when the level of the input is excessively high. Accordingly, the gain of a detail waveform, that is, a differential gain, becomes too large relatively. For this reason, the problem of an over-retouched picture such as one with excessively increased sharpness will arise when the input level is excessively high. To provide a solution to such a problem, it is effective to apply, to a detail waveform, the same gain as that applied to a fundamental waveform so that a differential gain should coincide with an average gain. This approach is explained below.

FIG. 13 is a circuit block diagram that illustrates an example of the configuration of a balanced suppressor to keep detail in original proportions. As illustrated in FIG. 13(a), which shows a first embodiment of the invention, a fundamental waveform and detail is extracted out of an input RGB signal. The suppression gain generation unit 614 generates a suppression gain from the extracted fundamental waveform. Multipliers 612a and 612b multiply the detail and the fundamental waveform by the generated suppression gain, respectively. Then, an adder 626 combines them together for a mixed output.

Alternatively, equalization processing is performed as follows. As illustrated in FIG. 13(b), a low frequency component fundamental waveform is obtained as a result of the passing of an input RGB signal through the low pass filter 622. A suppression gain is generated from the low frequency component fundamental waveform. Then, the input itself is multiplied by the suppression gain, thereby obtaining an output. In this processing, the maximum value of the RGB input may be detected first before it passes through the low pass filter 622 as illustrated in FIG. 13(c). Alternatively, each input of R, G, and B may be supplied to the low pass filter, followed by detection of the maximum value of the RGB input from the output of the low pass filter. As explained earlier, the low pass filter is not limited to an arithmetic low pass filter. It may be a logical filter. The logical filter and the maximum value detection circuit may be configured as a single unit. The output of the low pass filter 622 is supplied to a peak detection circuit. The peak detection circuit uses the low-pass output for detecting the peak of a video signal exclusive of a sharp peak.

FIG. 14 is a characteristics diagram that illustrates an example of the behavior of the detail ratio keep balanced suppressor illustrated in FIG. 13. As illustrated in FIG. 14(a) and (b), if the configuration illustrated in FIG. 13 is adopted, the inclination of a differential gain $\Delta Vo3/\Delta Vi3$ is equal to the inclination of an average gain Vo3/Vi3 even when the level is high, which is close to saturation. Therefore, it is possible to prevent contrast from changing when the level is high.

With the above configuration, it is possible to avoid a decrease in detail contrast and compress a dynamic range without impairing texture and three-dimensional appearance. Moreover, when combined with cooperative control of backlight and liquid crystal, it is possible to greatly improve contrast at a dark part.

However, since black becomes deeper because of the advantageous aspect described above, in a case where, for example, there is originally much noise in a dark part or there is perceptible quantization noise (especially, coarse noise attributable to compression), it could have the opposite effect of emphasizing the noise in high contrast, which makes it more conspicuous. To provide a solution to such a problem, it is effective to utilize the functions of a detail ratio keep balanced suppressor with the following additional characteristics for improvement.

FIG. 15 is a circuit block diagram that illustrates the configuration of a detail ratio keep balanced suppressor having characteristics for suppressing noise when the level is low. FIG. 15(a) shows a configuration in which a noise suppression curve generation circuit 636 lowers a gain applied to a detail waveform when the level of an input is low, thereby suppressing noise contained in an input signal, especially quantization noise. Except for the above, the configuration of the detail ratio keep balanced suppressor illustrated therein is the same as that of the detail ratio keep balanced suppressor illustrated in FIG. 13.

FIG. 15(b) shows a configuration in which a gain is lowered when the level is low depending on an original input supplied to a means for varying a peak AGC gain, which is provided upstream of a balanced suppressor, thereby suppressing noise. The illustrated configuration will offer the same advantages as those of the configuration illustrated in FIG. 15(a).

FIG. 16 is a characteristics diagram that illustrates an example of a noise suppression curve generated by the noise suppression curve generation circuit 636 illustrated in FIG. 15. The noise suppression curve has characteristics for lowering a gain when the level is low. As illustrated in FIG. 16(a), the gain-lowering part may be defined as the inclination of a straight line. Alternatively, as illustrated in FIG. 16(b), the gain-lowering part may be defined as an inverted parabolic curve.

FIG. 17 is a circuit block diagram that illustrates the configuration of a detail ratio keep balanced suppressor having characteristics for suppressing noise when detail is small. In the illustrated configuration, a non-linear characteristics generation circuit 638 applies dead-zone characteristics at positive and negative level regions around zero to a detail waveform. Then, the adder 626 combines a fundamental waveform and the detail waveform having the dead-zone characteristics together for a mixed output. By this means, a minute detail signal is masked, which makes input noise, especially quantization noise and video compression noise, less conspicuous.

FIG. 18 is a characteristics diagram that illustrates an example of noise-suppress non-linear characteristics generated by the non-linear characteristics generation circuit 638 illustrated in FIG. 17. Dead-zone characteristics applied at a positive level region and a negative level region around zero to a detail waveform may be defined as straight lines as illustrated in FIG. 18(a). Or, the dead-zone characteristics may be defined as a continuous curve with varying inclination as illustrated in FIG. 18(b). With such curve characteristics, it is possible to suppress noise at a dark part proportionally.

FIG. 19 is a circuit block diagram that illustrates an example of the configuration of a two-dimensional balanced suppressor to keep detail in original proportions. In the illustrated configuration, the low pass filter of the detail ratio keep balanced suppressor illustrated in FIG. 13(c) is configured as a two-dimensional filter. Except for the above, the configuration of the two-dimensional detail ratio keep balanced suppressor illustrated therein is the same as that of the detail ratio keep balanced suppressor illustrated in FIG. 13. Specifically, in the two-dimensional detail ratio keep balanced suppressor illustrated in FIG. 19, the maximum value of an RGB signal is inputted into a two-dimensional low pass filter 651, which includes a vertical low pass filter 634 for a vertical screen direction and a horizontal low pass filter 632 for a horizontal screen direction. A low frequency component fundamental waveform is obtained as a result of the passing of the input through the two-dimensional low pass filter 651. A suppression gain is generated from the low frequency component fundamental waveform. Then, the input video signal itself is multiplied by the suppression gain, thereby obtaining an output. A delay adjustment circuit 630 adjusts the input video signal in terms of a position in the vertical direction and the horizontal direction with the suppression gain generated through the two-dimensional LPF. In addition, since the maximum value of the RGB input is inputted into the vertical low pass filter 634 from the delay adjustment circuit 630, a line memory can be shared.

With the above method, it is possible to extract a detail component for a change in all directions, which makes it possible to reproduce detail with greater accuracy. In addition, a gain difference between micro areas near a saturation level is made smaller. For this reason, when there is a fine texture such as a fabric woven from a plurality of colored threads as described earlier, it is possible to suppress average color output unfaithfulness.

In the illustrated example, RGB Max circuits 606a and 606b are provided upstream of the vertical LPF to reduce a line memory for efficiency. However, each component of R, G, and B may be directly inputted into a two-dimensional LPF for the purpose of sharing with other video signal processing. In such a configuration, the RGB Max circuits can be provided in the suppression gain generation unit provided downstream of the two-dimensional LPF.

FIG. 20 is a block diagram that illustrates the configuration of the horizontal low pass filter illustrated in FIG. 19. FIG. 20(a) shows an example in which the horizontal low pass filter illustrated in FIG. 19 is configured as a 5-tap FIR low pass filter. FIG. 20(b) shows an example of the actual configuration of a transposition-type filter that is equivalent to the LPF shown in FIG. 20(a). The low pass filter shown in FIG. 20(a) includes 1-sample delay flip-flops 640a to 640d, FIR coefficient gain multipliers 642a to 642e, and an adder 644. The low pass filter shown in FIG. 20(b) includes the 1-sample delay flip-flops 640a to 640d, the FIR coefficient gain multipliers 642a to 642e, and adders 644a to 644d.

FIG. 21 is a block diagram that illustrates the configuration of the vertical low pass filter illustrated in FIG. 19. In the configuration of the illustrated low pass filter, the 1-sample delay flip-flops 640a to 640d shown in FIG. 20(a) are replaced by 1-line delay memories 646a to 646d for sampling in the vertical direction. For each of these horizontal low pass filter and vertical low pass filter, coefficients C1 to C5 are usually selected as "before-after" symmetric coefficients to ensure that its response characteristics should have before-after symmetric linear-phase characteristics.

FIG. 22 is a block diagram that illustrates an example of the configuration of the vertical low pass filter illustrated in FIG. 19 in which an FIR low pass filter and an IIR low pass filter are connected in cascade. In the illustrated configuration, an FIR low pass filter with a gain equal to one and an IIR low pass filter with a gain equal to one are provided in cascade as an upstream-side filter of a vertical low pass filter and a downstream-side filter thereof, respectively. The upstream FIR low pass filter includes the 1-line delay memories 646a, 646b, and 646c, the FIR coefficient gain multipliers 642a to 642d, the adder 644a, and the multiplier 642e. The 1-line delay memories 646a, 646b, and 646c are provided for sampling in the vertical direction. The FIR coefficient gain multipliers 642a to 642d determine the coefficients of the FIR low pass filter. The adder 644a adds up the coefficients. The multiplier 642e adjusts the final output gain of the FIR low pass filter. The downstream IIR low pass filter, which is a primary IIR filter, includes the adders 644b and 644c, IIR coefficient gain multipliers 643a and 643b, and the 1-line delay memory 646d.

FIG. 23 is a timing chart that illustrates an example of impulse response of the vertical low pass filter illustrated in FIG. 22. As illustrated in FIG. 23(a) and (b), the FIR filter and the IIR filter have impulse response that is almost symmetric with respect to a time axis. As their combined characteristics, a low pass filter that has impulse response that is almost "before-after" symmetric with respect to a time axis as illustrated in FIG. 23(c) can be obtained.

The reason why the above configuration in which the FIR filter and the IIR filter are connected in cascade is adopted is as follows. If an FIR filter only is used to obtain before-after symmetry with respect to a time axis, in other words, if an FIR filter only is used to configure a linear-phase low pass filter, it is necessary to provide a signal delay means having a length that corresponds to the length of impulse response, which requires much memory. It is necessary to provide one line memory for each delay corresponding to one sample in order to configure the vertical LPF illustrated in FIG. 19. Therefore, in this example, an IIR low pass filter, which requires far less memory, is used for memory reduction.

It is preferable to fine adjust the coefficients C1 to C5 of the FIR part illustrated in FIG. 22 after the adjustment of the coefficient C6 of the IIR part (in this example, since the IIR part is a primary filter, a time constant is determined). By this means, it is possible to freely adjust the degree of before-after symmetry of the important part of impulse response. In addition, it is also possible to configure a linear-phase high pass filter by subtracting the low pass filter output from a center output, which is an input delay adjustment output. In principle, the same characteristics can be obtained irrespective of whether the FIR part or the IIR part is provided as the upstream-side filter in cascade connection. However, in terms of memory bit length and precision, it is preferable to provide the FIR part as the upstream-side filter and the IIR part as the downstream-side filter because such connection offers good characteristics with a smaller memory capacity.

FIG. 24 is a block diagram that illustrates an example of the configuration of the vertical low pass filter illustrated in FIG. 19 in which an FIR low pass filter and an IIR low pass filter are connected in parallel. In the illustrated configuration, an FIR low pass filter and an IIR low pass filter are connected to the adder 644a in parallel to make up a vertical low pass filter. The FIR low pass filter includes the 1-line delay memories 646a, 646b, and 646c, which are provided for sampling in the vertical direction, the FIR coefficient gain multipliers 642a to 642d, which determine the coefficients of the FIR low pass filter, and the adder 644a, which adds up the coefficients. The IIR low pass filter, which is a primary IIR filter, includes the adders 644b and 644c, the IIR coefficient gain multipliers 643a, 643b, and 643c, and the 1-line delay memory 646d. The output of the multiplier 643c is inputted into the adder 644a. A gain adjustment multiplier 645 adjusts a final output gain to generate the output of the illustrated vertical low pass filter.

FIG. 25 is a timing chart that illustrates an example of impulse response of the vertical low pass filter illustrated in FIG. 24. As illustrated in FIG. 25(a), the FIR filter generates the former part of impulse response. As illustrated in FIG. 25(b), the IIR filter generates the latter part of impulse response. As their combined characteristics, a low pass filter that has impulse response that is almost before-after symmetric with respect to a time axis as illustrated in FIG. 25(c) can be obtained. Among effective coefficient values (which do not include zero) illustrated therein, "1", "2", "3", and "4" shown at the left are the FIR impulse response. Among the effective coefficient values, "3", "1.5", "0.75", "0.38", ... shown at the right are the IIR impulse response. As explained above, the left part of impulse response has a finite time length, whereas the right part of impulse response has an infinite time length. In the illustrated example, each of words adjacent to the center response has the same coefficient value of $3/16$. In addition, the sum of coefficient values at the left finite side is $6/16$. The sum of coefficient values at the right infinite side is also ⁶⁄₁₆. Therefore, time-axis symmetric characteristics having a high degree of approximation can be obtained.

In comparison with a configuration in which an FIR filter only is used, the parallel connection of the FIR filter and the IIR filter explained above contributes to memory reduction, as is the case with the foregoing cascade connection. In addition, as explained for the cascade-connection configuration, it is also possible to configure a high pass filter by subtracting the low pass filter output from a center output, which is an input delay adjustment output.

FIG. 26 is a diagram that illustrates a first configuration example in which the vertical low pass filter illustrated in FIG. 19 or the horizontal low pass filter illustrated therein is configured not as a linear low pass filter (arithmetic low pass filter) but as a logical filter with the use of a maximum value filter. As illustrated in FIG. 26(a), the logical filter includes the 1-sample delay flip-flops 640a to 640d, the adders 644a to 644e, and a maximum value selection circuit 648. The adders 644a to 644e add offset amounts C1 to C5 to the outputs of these flip-flops. The maximum value selection circuit 648 outputs the maximum value of the inputted five samples. As illustrated in FIG. 26(b), negative offset coefficients that decrease from the center toward the ends are set for the offset amounts C1 to C5 as a window function of the logical filter.

FIG. 27 is a diagram that illustrates a second configuration example in which the vertical low pass filter illustrated in FIG. 19 is configured not as a linear low pass filter but as a logical filter with the use of a maximum value filter. As illustrated in FIG. 27(a), the logical filter includes the multipliers 642a to 642e as a substitute for the adders 644a to 644e illustrated in FIG. 26. The maximum value of the results of weighting processing performed by these multipliers is outputted selectively. As illustrated in FIG. 27(b), coefficients that decrease from the center toward the ends are set for the coefficients C1 to C5 of the multipliers as a window function of the logical filter. When a linear low pass filter is used, the risk of the occurrence of overflow increases due to a detail keep function, a detail ratio keep function, or the like if the level of an input is high and further if the amplitude of detail is large. In contrast, with the use of a maximum value filter, since an overflow margin increases, it is possible to prevent detail from being lost and prevent a color balance from being disrupted due to the processing of a downstream overflow limiter. Besides a configuration for selecting the maximum value exactly, various rank order filters such as median filters or other logical filters may be used as a configuration for selecting the maximum value illustrated in FIGS. 26 and 27.

FIG. 28 is a diagram that illustrates another example of the configuration of a low pass filter for detail-keeping use, which is configured with the use of the horizontal low pass filter and the vertical low pass filter shown in FIG. 19. FIG. 28(a) shows a configuration example in which the output of a two-dimensional linear low pass filter 650 and the output of a two-dimensional maximum value filter 652 illustrated in FIGS. 26 and 27 are mixed with each other to extract a fundamental waveform. A multiplier 645a multiplies the output of the two-dimensional linear low pass filter 650 by a coefficient kL. A multiplier 645b multiplies the output of the two-dimensional maximum value filter 652 by a coefficient kM. The adder 644 combines them to extract a fundamental waveform. With such a configuration, besides an advantage of the natural behavior of the linear low pass filter, an overflow margin can be increased through the mixture of the maximum value filter at a part where there is much detail. Therefore, even when an overflow limiter such as one shown in FIG. 11(c) with the reference numeral 628 is provided downstream thereof, detail will not be lost.

FIG. 28(b) shows a configuration example in which the output of the two-dimensional linear low pass filter 650 and the output of a delay adjustment circuit 654, which allows an input signal to pass through as it is, are mixed with each other to extract a fundamental waveform with limited amount of attenuation in a high frequency region. The multiplier 645a multiplies the output of the two-dimensional linear low pass filter 650 by a coefficient 1-k. The multiplier 645b multiplies the output of the delay adjustment circuit 654 by a coefficient k. The adder 644 combines them with each other to extract a fundamental waveform. FIG. 28(c) is a diagram that illustrates spatial frequency characteristics for FIG. 28(b). The horizontal axis of FIG. 28(c) represents spatial frequency characteristics in the vertical direction or in the horizontal direction. The vertical axis of FIG. 28(c) represents response gain. The output of the two-dimensional linear low pass filter 650 is shown by a dotted line labeled as "LPF characteristics" in the drawing. The output of the delay adjustment circuit 654 is shown by a dotted line labeled as "straight characteristics" in the drawing. The mixing of these outputs will produce effects shown as "high-frequency attenuation limitation" in the drawing. With the limitation on the amount of attenuation in the high frequency region of the low pass filter, there is an advantageous effect of preventing a very thin bright line from being relieved from a fundamental waveform without any restriction and preventing the thin line from being substantially cut off by a downstream overflow limiter, which will otherwise cause color output unfaithfulness. In addition, when the output of the low pass filter shown in FIG. 28(a) and (b) is applied to a signal that is inputted into a peak detection circuit that is provided in a configuration for liquid crystal cooperative control with a suppressor, which is explained below with reference to FIGS. 29, 30, 32, and 34, the following effects can be expected. A peak level will be detected as a rather large value due to the small amount of attenuation in a high frequency region when there are many detail signal components; and, through feedback control, the amount of application of suppressor processing and overflow limiter processing to a detail signal is reduced.

FIG. 29 is a block diagram that illustrates a configuration in which a suppressor function and liquid crystal backlight cooperative control are combined. A block area shown by a dotted frame in the drawing is a suppressor unit. Other blocks are components of a liquid crystal backlight cooperative control unit. The suppressor unit shown by a dotted line includes the two-dimensional low pass filter 651, which extracts a fundamental wave component. The two-dimensional low pass filter 651 is made up of the horizontal low pass filter 632 for the horizontal screen direction shown in FIG. 19 and the vertical low pass filter 634 for the vertical screen direction shown therein. The suppression gain generation circuit 614 generates a suppression gain from a fundamental wave component extracted by the two-dimensional low pass filter. The delay adjustment circuit 630 outputs two-dimensional detail obtained through vertical and horizontal position adjustment. The multiplier 612 performs detail ratio keep suppression. The part enclosed by the dotted line in the drawing functions as a detail ratio keep balanced suppressor 625 shown in FIG. 19. A dither is added to the suppressed video signal. The overflow limiter 628 prevents the overflow of a mixed signal, which is a combination of a detail signal and a fundamental wave signal. After the overflow limitation processing, the video signal is inputted into a liquid crystal driver 24 for display on a liquid crystal panel 10.

In the liquid crystal backlight cooperative control unit, a peak detection unit 412 detects a brightness peak from the output of the two-dimensional low pass filter 651. After integration processing performed by a loop filter 414, a function 404a performs light distribution compensation function processing. As feedback processing for the result, a multiplier 402 performs gain adjustment processing. Besides the output of the two-dimensional low pass filter 651, an APL link signal detected by a maximum APL detection unit 415, which detects the maximum value of APL, is inputted into the peak detection unit 412.

On the other hand, the output of the loop filter 414 is supplied to a function 404b. To perform inverse compensation at a backlight side for offsetting the effects of changing the degree of modulation at a liquid crystal side, the function 404b calculates backlight control amount. On the basis of the calculation result, a light control unit 406 generates a light control signal. The brightness control of a backlight 11 through a backlight driver 26 is performed on the basis of the light control signal.

With the above configuration, it is possible to perform liquid crystal backlight cooperative control with a suppressor function. In this liquid crystal backlight cooperative control, complex histogram arithmetic operation can be avoided. In addition, it is possible to increase the degree of liquid crystal modulation by a margin in the peak of a video signal. Accordingly, it is possible to decrease backlight brightness due to the increased degree of liquid crystal modulation. Therefore, the effects of energy saving and improvement in contrast can be expected because of reduced backlight brightness while keeping the same video brightness.

In the above means for enhancing contrast and dark-part tone reproduction and reducing backlight power consumption utilizing the liquid crystal backlight cooperative control, when the video signal suppressor illustrated in FIGS. 4 to 7 is used in combination therewith to prevent the occurrence of video signal overflow, suppression is sometimes applied to a video signal whose level is in a range in which overflow will not occur even if a gain is increased or to a video signal for which a gain is not increased, despite the fact that it should not be applied thereto in such a case. For example, suppression is needlessly applied when overflow will not occur even without any processing because the level of an input signal is exactly 100%. For this reason, a problem arises in that, for example, output video will be darker than it is supposed to be or that contrast at a light part decreases needlessly. Although this can be prevented by means of the aforementioned detail ratio keep suppressor for detail at a light part, that is, for a high frequency component in the video horizontal direction or the video vertical direction, there is an adverse possibility that a level change could be compressed needlessly for a low frequency component.

A variable suppressor could provide a solution to such a problem. Specifically, instead of applying a fixed suppress curve after a means for varying a video gain, a plurality of suppress curves corresponding to video gains required is prepared. An input video signal is directly inputted into the suppressor. Depending on a required gain, its output is variably mixed. By this means, the variable suppressor applies a suitable suppress curve depending on an arbitrary gain. An example of the configuration of such a variable suppressor is explained below.

FIG. 30 is a block diagram that illustrates a first example of the configuration of a variable suppressor. A suppressor unit shown by a dotted line in FIG. 30 includes a suppress difference gain curve generation unit 660, which generates a suppress curve corresponding to the value of a gain Gv that is required by a liquid crystal backlight cooperative control unit. A multiplier 409b multiplies a difference gain curve Gs−1 generated by the suppress difference gain curve generation unit 660 by a video gain difference signal ΔGv that is outputted from the function 404a to generate a total difference gain ΔGT. The adder 626a adds the total difference gain ΔGT to a gain 1 to generate a total gain GT. A multiplier 409a multiplies the output of the delay adjustment circuit 630 by the total gain GT to generate a video signal for driving liquid crystal.

FIG. 31 is a graph that illustrates the characteristics of the variable suppressor illustrated in FIG. 30. As illustrated in FIG. 31(a), a curve without suppression for a required video gain Gv=1, that is, a curve of a fixed gain=1, and a suppress curve for a required video gain Gv=2 are prepared. The suppress difference gain curve generation block 660 illustrated in FIG. 30 generates the suppress difference gain curve Gs−1 as a difference. The multiplier 409b multiplies the difference gain curve Gs−1 by the difference gain ΔGv outputted from the function 404a to generate the total difference gain ΔGT, which is added by the adder 626a to the gain=1. In this way, the curve of the total gain GT illustrated in FIG. 31(b) can be obtained. That is, the curve of the total gain GT is generated by changing the mixture ratio of the curve of Gv=1 and the curve of Gv=2 shown in FIG. 31(a). The multiplier 409a directly multiplies an input by the total gain curve GT to obtain a total output V0 having characteristics shown in FIG. 31(c). Since the liquid crystal backlight cooperative control unit is configured in the same manner as shown in FIG. 29, its explanation is omitted here.

In the illustrated example, suppression gain curves corresponding to two required gains as references are used. As a modification example, suppression gain curves corresponding to three or more required gains as references may be used, where, depending on the value of a required gain, a corresponding suppress may be output through internal division to generate the total gain.

FIG. 32 is a block diagram that illustrates an example of generating a final video output by variably mixing video outputs corresponding to a plurality of prepared suppression gain curves depending on a required video gain instead of mixing a plurality of suppression gain curve outputs. As illustrated in FIG. 32, in this example, the multiplier 409b multiplies the suppress difference gain curve Gs−1 generated by the suppress difference gain curve generation unit 660 by the required video gain difference ΔGv to generate the total gain difference ΔGT. The multiplier 409a multiplies an input video signal by the total gain difference ΔGT to generate a differential video signal VD. The adder 626a adds the differential video signal VD to the input video signal to generate a video output signal V0. Other components are the same as those of FIG. 30.

FIG. 33 is a graph that illustrates the characteristics of the variable suppressor illustrated in FIG. 32. As illustrated in FIG. 33(b), the input-output characteristics of the differential video signal VD that is generated by the multiplier 409a have suppression characteristics depending on a required video gain.

FIG. 34 is a block diagram that illustrates a configuration example in which a fixed suppression gain and a required video gain are subjected to smaller gain priority combination to generate a total gain. In the illustrated example, unlike the mixture of a plurality of suppression gains described above, a suppression gain curve unit 662 generates a suppression gain value Gs for each video input on a fixed suppression gain curve that is set to ensure that an output should not go over an arbitrary input; a small gain priority combination unit 664 compares the suppression gain value Gs with the required video gain value Gv outputted from the function 404a and selectively uses the smaller gain value to generate the total gain GT; thereafter, the final video output signal V0 is generated as a result of the multiplication of input video by the total gain GT.

FIG. 35 is a graph that illustrates the characteristics of the variable suppressor illustrated in FIG. 34. As illustrated in FIG. 35(*a*), a single fixed suppression gain curve Gs is prepared. As illustrated in FIG. 35(*b*), the total gain curve GT is obtained through the selection of either the suppression gain value Gs or the required gain value Gv, whichever is smaller. As a result, total video input-output characteristics illustrated in FIG. 35(*c*) can be obtained.

FIG. 36 is a block diagram that illustrates the configuration of the small gain priority combination unit illustrated in FIG. 34. As illustrated in FIG. 36, the small gain priority combination unit includes a transition curve generation unit 670, a comparator 672, and a selector 674. The transition curve generation unit 670 generates a transition curve with the use of a difference between the suppress curve Gs and the required video gain Gv and a difference between Gv and "1". The comparator 672 compares the generated transition curve, the suppress curve Gs, and the required video gain Gv. The selector 674 selectively outputs the smallest gain value found as a result of comparison to generate the total gain GT.

If the selector 674 selects the smaller one of the two input curves Gs and Gv for switchover, a switchover part will be angled. Therefore, in some cases, a false contour like a contour line appears in, for example, a gradual brightness change part of output video. Accordingly, the selector 674 should preferably select the output of the transition curve generation unit when a difference between the two curve values of Gs and Gv falls within a certain range. In accordance with the difference and a margin from the gain lower limit value "1", the transition curve generation unit 670 should preferably generate, for example, a transition curve such as a parabola tangent to the two curves for gradual transition. In each of the methods shown in FIGS. 30, 32, and 34, multiplication of a required video gain and suppression are performed concurrently on input video. Therefore, if a peak level is detected from an output after the multiplication of the required video gain by a conventional method as in FIG. 29, correct peak AGC feedback will not be applied because suppression has already been performed concurrently. Therefore, in the configuration shown in FIGS. 30, 32, and 34, the dedicated multiplier 402 for peak AGC feedback is provided. The result of the multiplication of the video fundamental waveform of the output of the input two-dimensional filter by the required video gain Gv only is supplied to a peak detection circuit.

With these means, balanced suppress or detail keep balanced suppress can be applied only when it is necessary. Video signal full scale can be utilized for any required video gain, thereby ensuring the maximum linearity and the maximum video range. Therefore, it is possible to avoid video from becoming dark needlessly, which contributes to backlight brightness saving and energy conservation. Moreover, since a signal level region to be suppressed decreases, degradation in image quality is minimized.

FIG. 37 is a block diagram that illustrates a configuration example in which a detail upper limit is set for preventing the overflow of a suppressor output. In this example, the low pass filter 622 shown in FIGS. 11, 13, 15 and 17 are replaced by a configuration shown in FIG. 37(*a*) and (*b*). As illustrated in FIG. 37(*a*), in the low pass filter with a limiter 622, a low pass filter limit function 682 processes a signal inputted into the low pass filter 680 and a signal outputted therefrom. A larger input selection circuit 684 compares the original output of the low pass filter 680 with the processing result of the low pass filter limit function 682 and selectively outputs the larger one.

The illustrated configuration is effective as a means for solving the following problem. In a suppress circuit that keeps a detail signal as shown in FIGS. 11, 13, 15 and 17, in some cases, the upper limit of the kept detail signal exceeds full scale under conditions in which a high-level input is suppressed considerably and, in addition, the amplitude of detail is large. In such a case, a downstream overflow limiter limits each color component independently to full scale, which causes a disruption in a color balance. Therefore, the original function of the balanced suppressor will be hindered. For this reason, it is preferable to set a limit on a detail keep function and a detail ratio keep function so that it does not go beyond the level immediately before processing at a downstream overflow limiter or it is limited to a slight overflow level. Such a limit is set with the ratio of color components being kept.

As an example of limiting methods, a part of an input signal of the low pass filter 622 shown in FIGS. 11, 13, 15 and 17 is added as may be necessary if overflow is likely to occur, thereby avoiding a large overflow. FIG. 37(*a*) shows an example of the configuration of a low pass filter with a limiting function. FIG. 37(*b*) shows its specific example.

As illustrated in FIG. 37(*b*), the output of the low pass filter 680 is subtracted from a reference value close to full scale (in this example, a full-scale value of 200% before suppression). The result of subtraction is multiplied by a given coefficient (in this example, 1/8) that depends on a suppression characteristics curve to generate a detail margin approximate signal. The detail margin approximate signal is generated to have substantially the same value as a true detail margin depending on a suppress static characteristic curve for a fundamental waveform excluding detail.

FIG. 38 is a diagram for explaining the generation of a detail margin approximate signal at the low pass filter with the limiter 622 illustrated in FIG. 37. A triangular shaded area in the upper part of FIG. 38, which corresponds to a difference between a reference output (in this example, a full-scale value of 200%) and a low pass filter output, and a triangle-like hatched area in the lower part of FIG. 38, which corresponds to a difference between the 100% full-scale output of a suppressor and a suppress static characteristic curve and represents a true detail margin, will be substantially similar in shape if the vertical axis is reduced in scale with respect to the same low pass filter output level. Therefore, the detail margin approximate signal can be obtained as a result of the multiplication of, by a homothetic ratio (in this example, ⅛), the result of the subtraction of the low pass filter output from the reference value.

Overflow occurs when the detail, that is, a difference between the input-side signal of the low pass filter 680 shown in FIG. 37 and the output-side signal thereof is larger than the true detail margin. Therefore, when the value obtained by subtracting the detail margin approximate signal from the low pass filter input signal is larger than the low pass filter output value, the larger input selection circuit 684 shown in FIG. 37 outputs such a larger signal instead of outputting the low pass filter output. With such a configuration, when the input exceeds the detail margin, the low pass filter 680 is disabled for the excessive input signal. Therefore, a function for keeping the excessive detail signal is disabled.

A conventional low pass filter output may be used for a low pass filter output signal that is sent to a peak level detection circuit. Or, the maximum level selection output added in this example may be used. When the maximum level selection output is used, the output will be larger than a usual low pass filter output when there is no suppress margin; accordingly, a video peak feedback function acts from a peak level detection circuit in a direction for lowering the video gain Gv, that is, the direction of securing a greater suppress margin. Thus, it has the effect of easing the burden for suppressor processing and overflow limiter processing.

The balanced suppressors explained above can be effectively used for reducing the power consumption of a light source by setting a high average modulation gain, thereby decreasing the brightness of the light source inversely in a direct-view-type LCD TV, or a light-source-modulation-type display device such as a projector, a rear projector or the like. In addition, contrast, tone, color reproduction, and viewing angle at a dark part improve.

Notwithstanding the above, they can be applied to a video signal only not in combination with variable light-source brightness in other display devices such as CRT, plasma display, EL, or FED without any limitation to a light-source-modulation-type display. When so applied, it is possible to compress a video dynamic range while keeping high contrast to output a picture that is easily viewable even under bright ambient conditions with reduced power consumption.

Though suppressor circuits according to the foregoing embodiments and their application circuits are explained with reference to circuit block diagrams, their configurations are not limited to circuit hardware. Needless to say, they may be embodied as software with equivalent processing by means of a CPU, a DSP, or the like.

Industrial Applicability

Offering more sophisticated video processing capability, the present invention can be applied to a large LCD that requires high picture quality and reduced power consumption.

BRIEF DESCRIPTION OF DRAWINGS

FIG. 1 A diagram that schematically illustrates a first example of a conventional preventive measure against overflow;

FIG. 2 A diagram that schematically illustrates a second example of a conventional preventive measure against overflow;

FIG. 9 A characteristics diagram that illustrates a decrease in contrast that arises when the level is high with the balanced suppressor illustrated in FIG. 4 or FIG. 7 being used;

FIG. 10 A diagram that illustrates how color output unfaithfulness on average color occurs in a case where there is a texture of different colors when the balanced suppressor illustrated in FIG. 7 is used;

FIG. 19 A circuit block diagram that illustrates an example of the configuration of a two-dimensional balanced suppressor to keep detail in original proportions;

FIG. 20 A block diagram that illustrates the configuration of a horizontal low pass filter illustrated in FIG. 19;

FIG. 25 A timing chart that illustrates an example of impulse response of the vertical low pass filter illustrated in FIG. 24;

FIG. 26 A diagram that illustrates a first configuration example in which the vertical low pass filter illustrated in FIG. 19 is configured not as a linear low pass filter but as a logical filter with the use of a maximum value filter;

FIG. 27 A diagram that illustrates a second configuration example in which the vertical low pass filter illustrated in FIG. 19 is configured not as a linear low pass filter but as a logical filter with the use of a maximum value filter;

FIG. 28 A diagram that illustrates an example of the configuration of a low pass filter for detail-keeping use, which is configured with the use of the horizontal low pass filter and the vertical low pass filter shown in FIG. 19;

Figure 3:
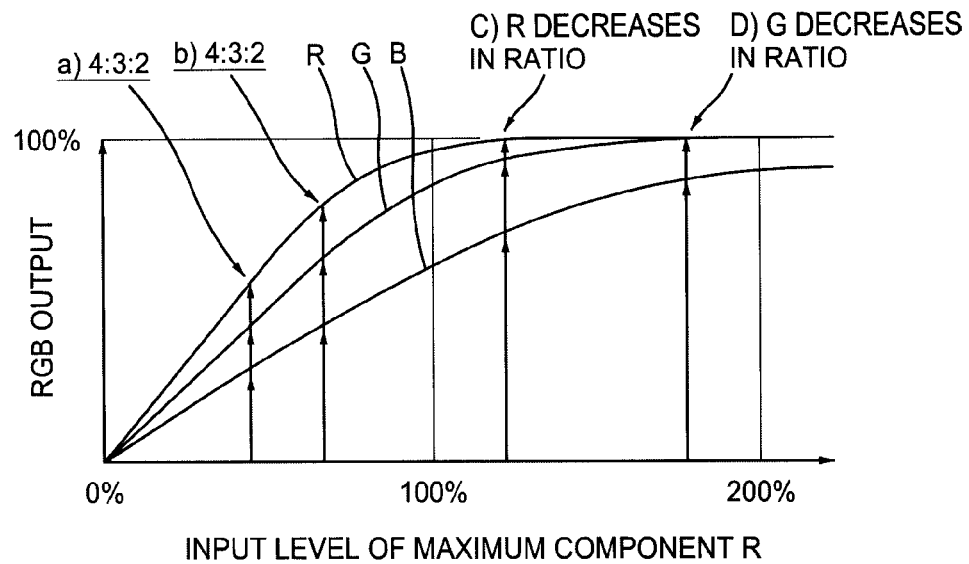
FIG. 3 A diagram that schematically illustrates an example of the disruption of a color balance that occurs when the non-linear gamma suppressor illustrated in FIG. 2 is employed.
Figure 4:
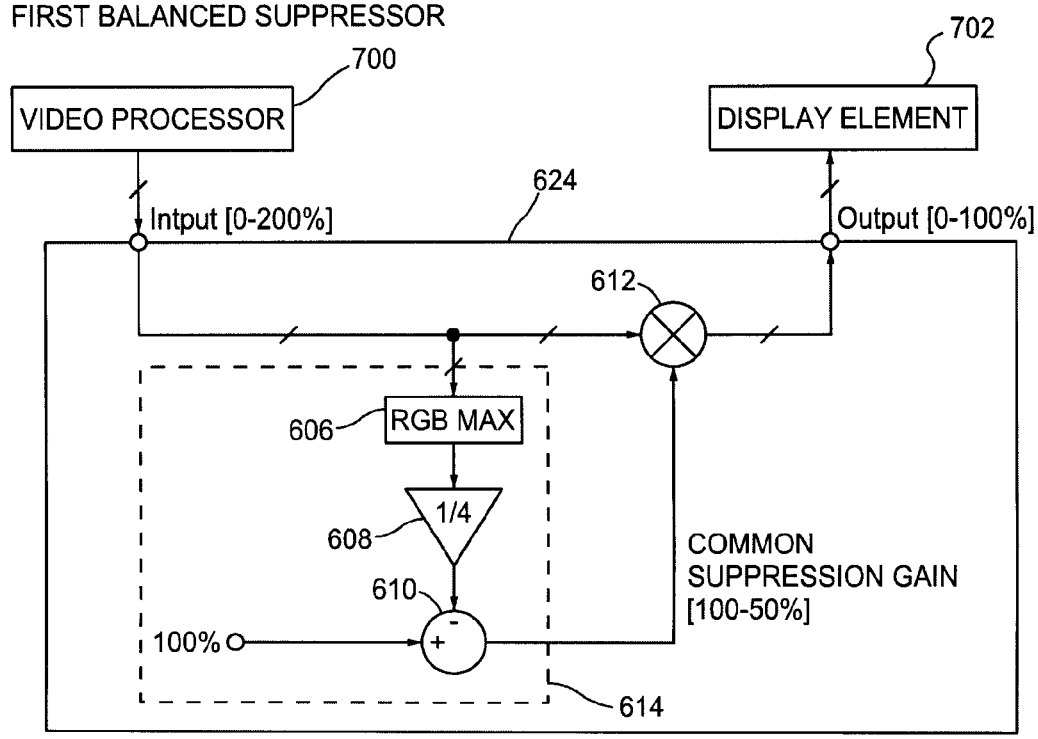
FIG. 4 A circuit block diagram that illustrates the configuration of a balanced suppressor according to a first embodiment of the invention.
Figure 5:
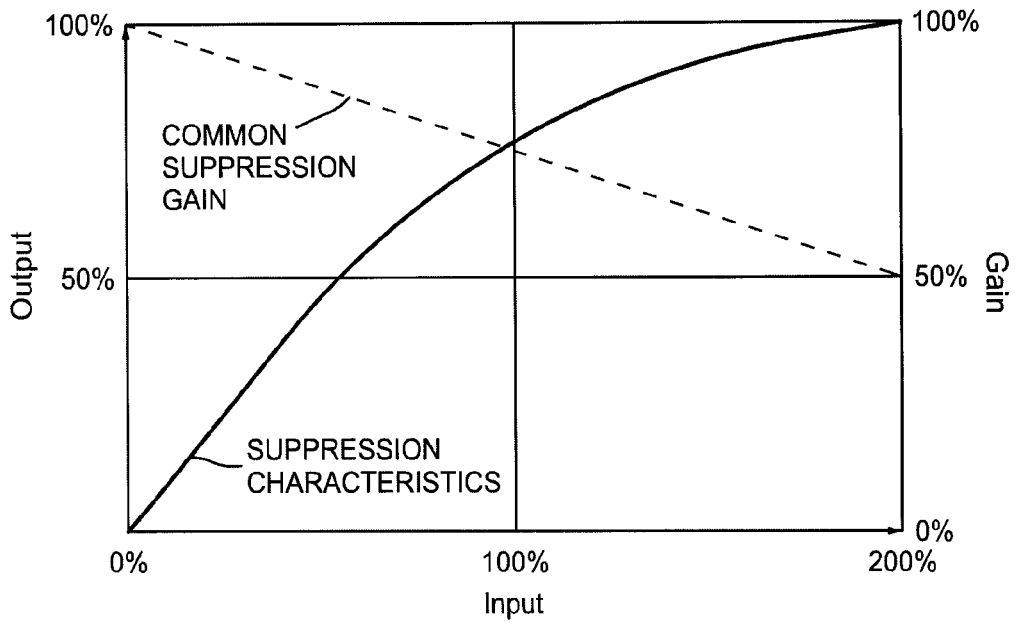
FIG. 5 A characteristics diagram that illustrates an example of a suppression characteristics of the balanced suppressor illustrated in FIG. 4.
Figure 6:
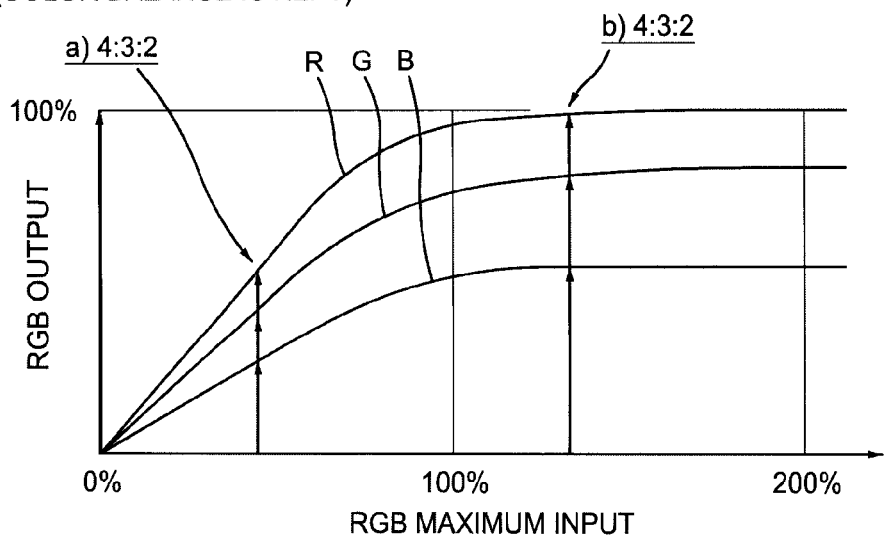
FIG. 6 A characteristics diagram that illustrates an example of the behavior of the first balanced suppressor illustrated in FIG. 4.
Figure 7:
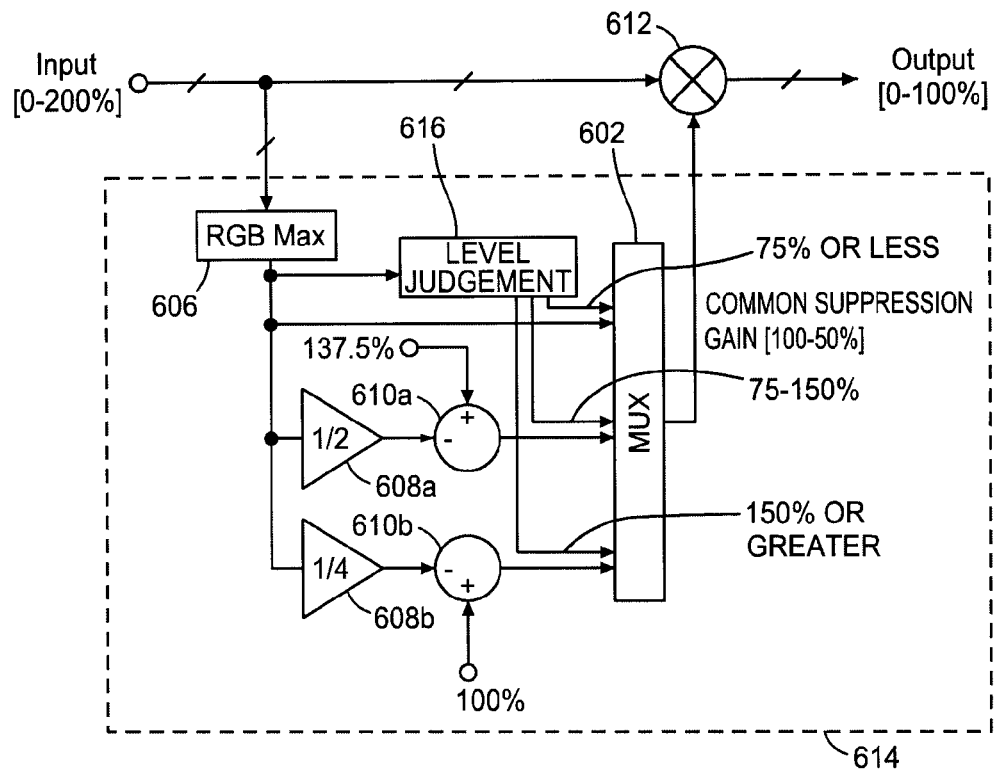
FIG. 7 A circuit block diagram that illustrates an example of the configuration of a balanced suppressor according to a second embodiment of the invention.
Figure 8:
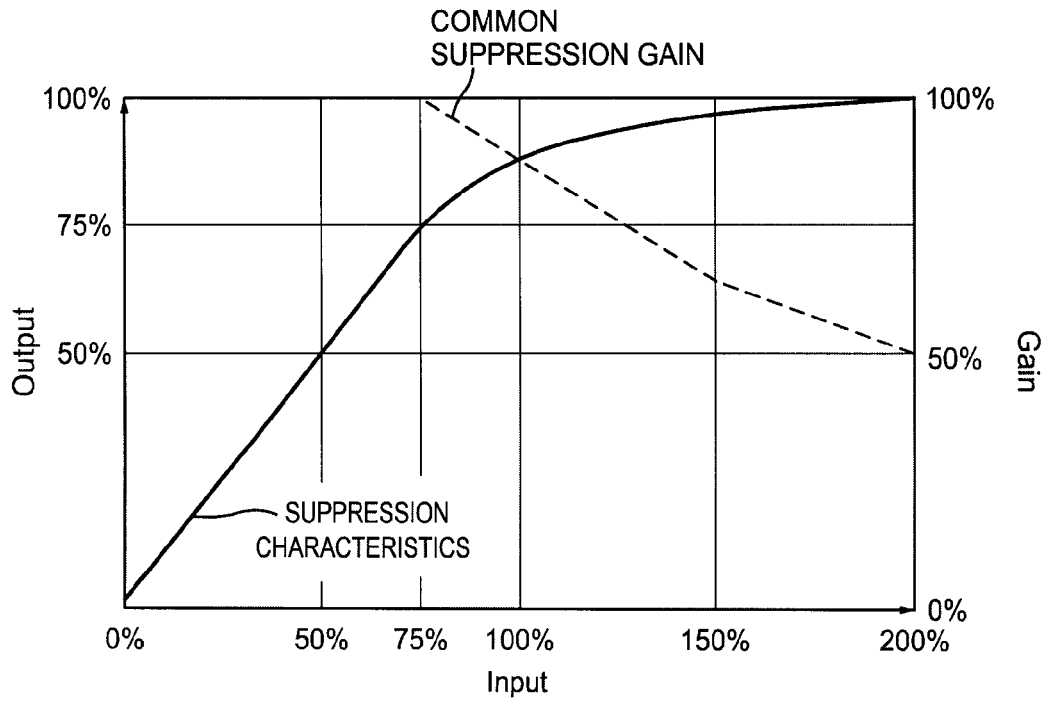
FIG. 8 A characteristics diagram that illustrates an example of the operation of the balanced suppressor illustrated in FIG. 7.
Figure 11:
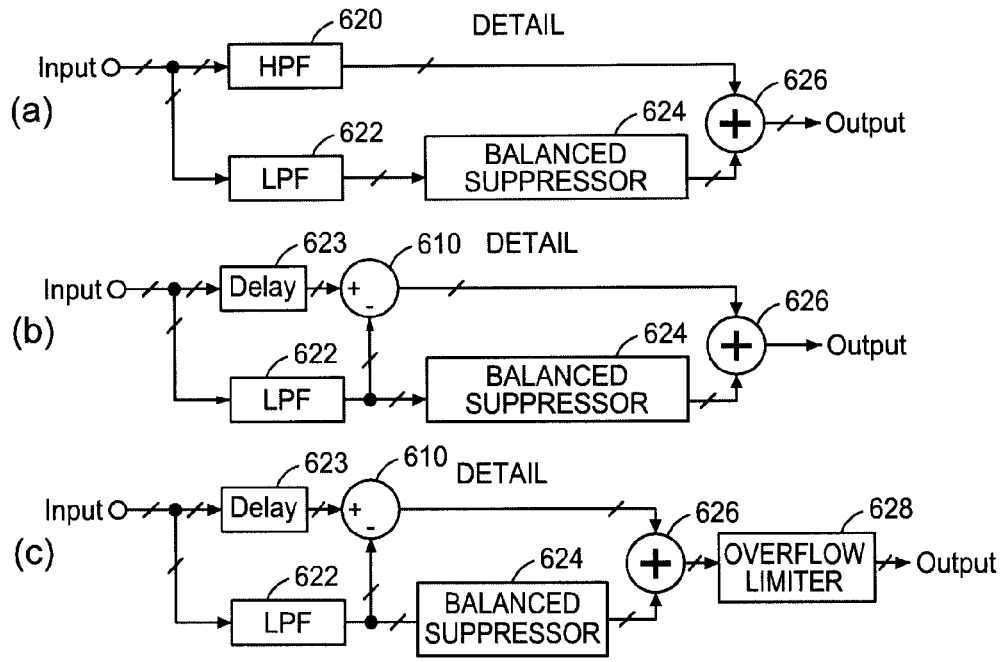
FIG. 11 A circuit block diagram that illustrates an example of the configuration of a balanced suppressor to keep details according to first, second, and third embodiments of the invention.
Figure 12:
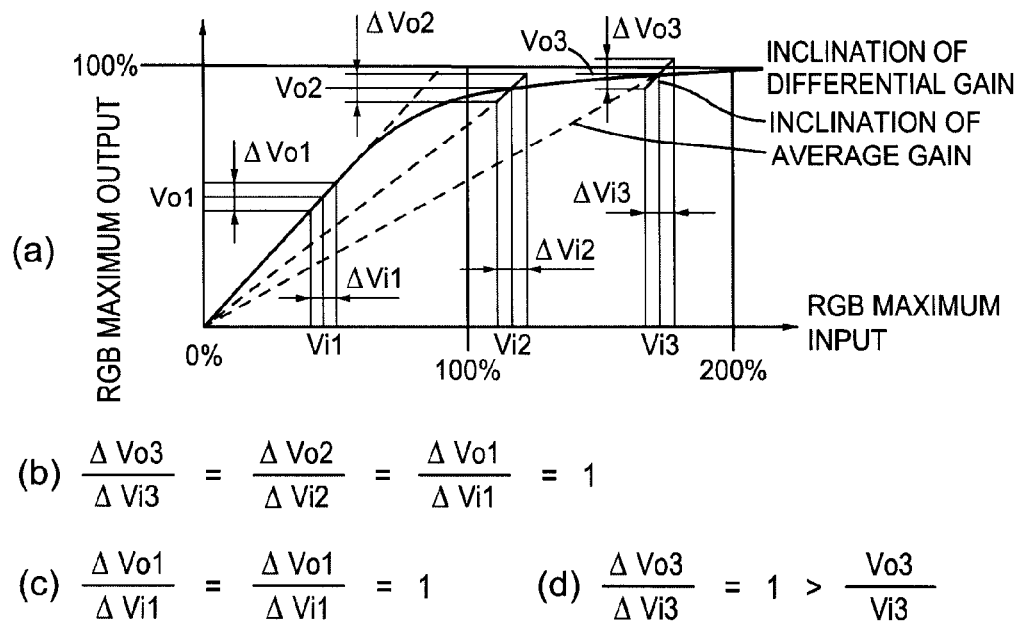
FIG. 12 A characteristics diagram that illustrates an example of the behavior of the balanced suppressor to keep details illustrated in FIG. 11.
Figure 13:
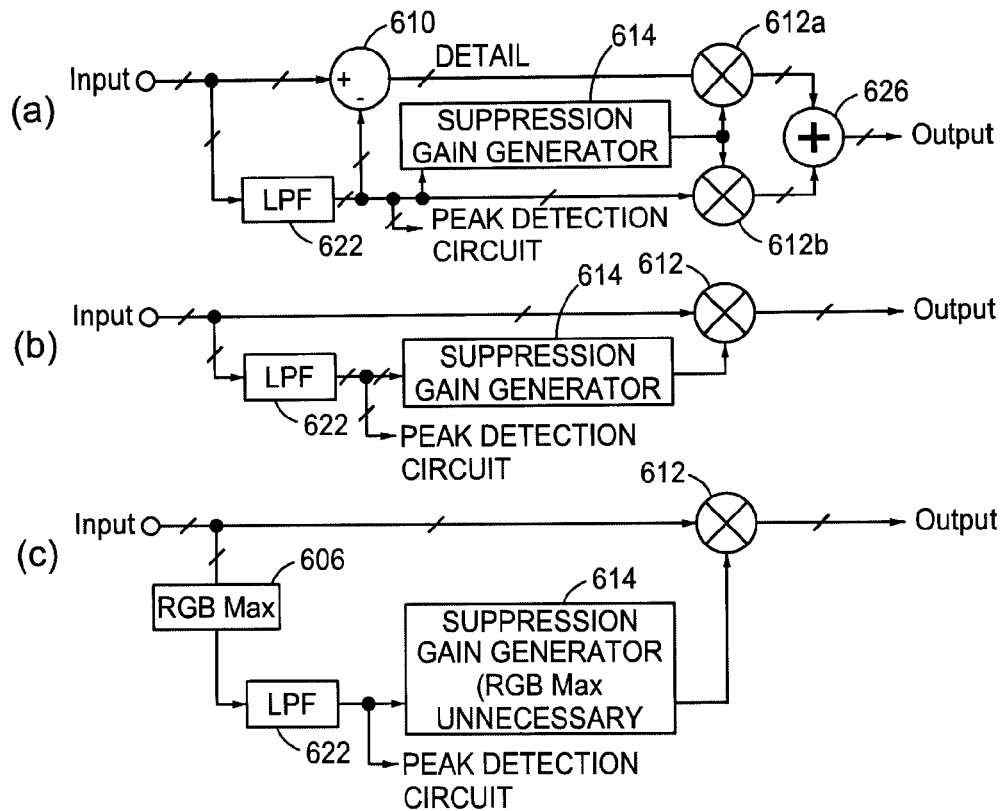
FIG. 13 A circuit block diagram that illustrates an example of the configuration of a balanced suppressor to keep detail in original proportions.
Figure 14:
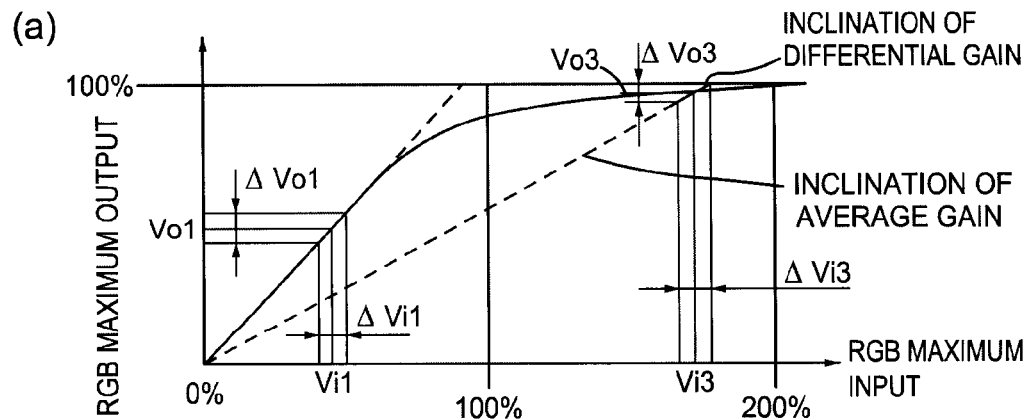
FIG. 14 A characteristics diagram that illustrates an example of the behavior of the balanced suppressor to keep detail in original proportions illustrated in FIG. 13.
Figure 15:
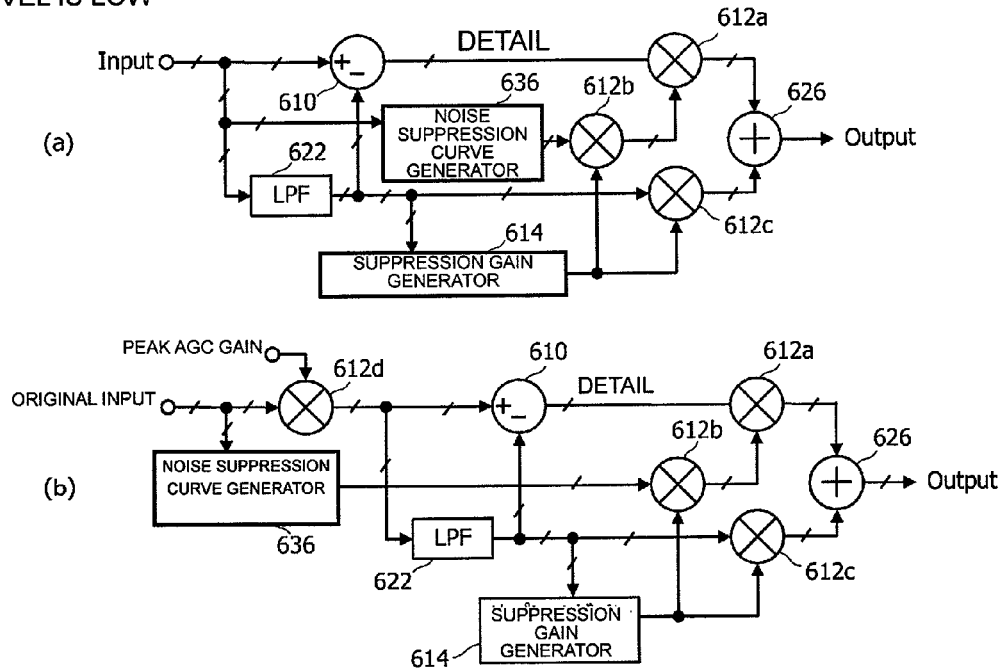
FIG. 15 A circuit block diagram that illustrates the configuration of a detail ratio keep balanced suppressor having characteristics for suppressing noise when the level is low.
Figure 16:
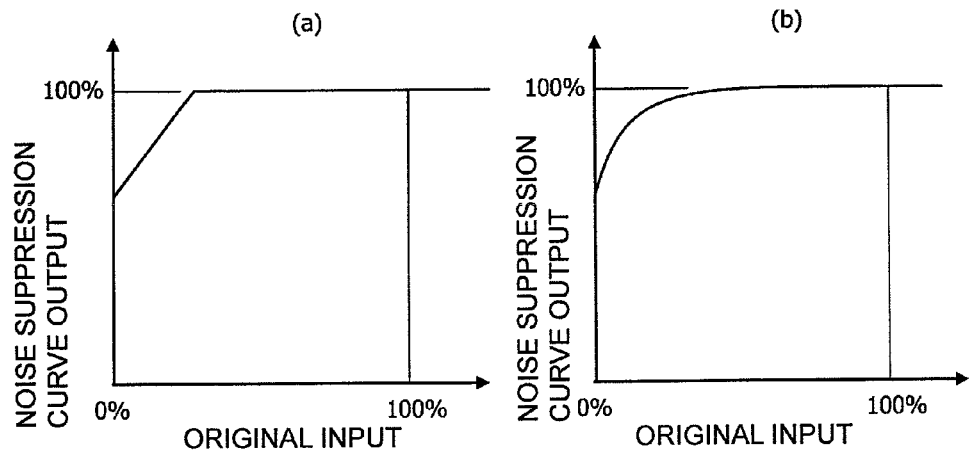
FIG. 16 A characteristics diagram that illustrates an example of a noise suppression curve generated by a noise suppression curve generation circuit illustrated in FIG. 15.
Figure 17:
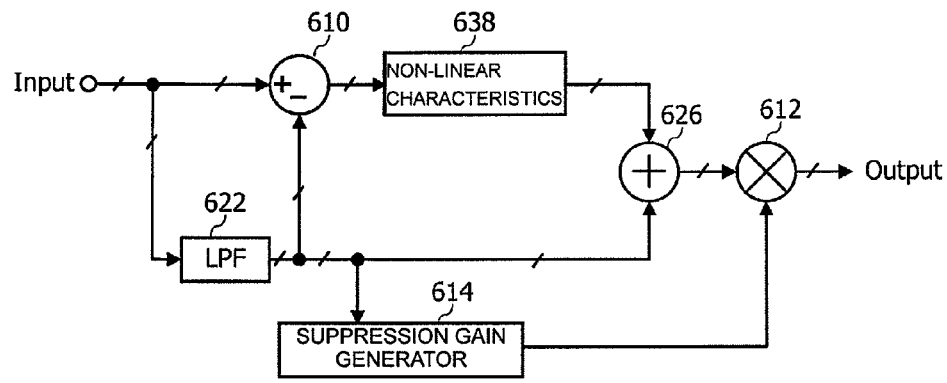
FIG. 17 A circuit block diagram that illustrates the configuration of a detail ratio keep balanced suppressor having characteristics for suppressing noise when detail is small.
Figure 18:
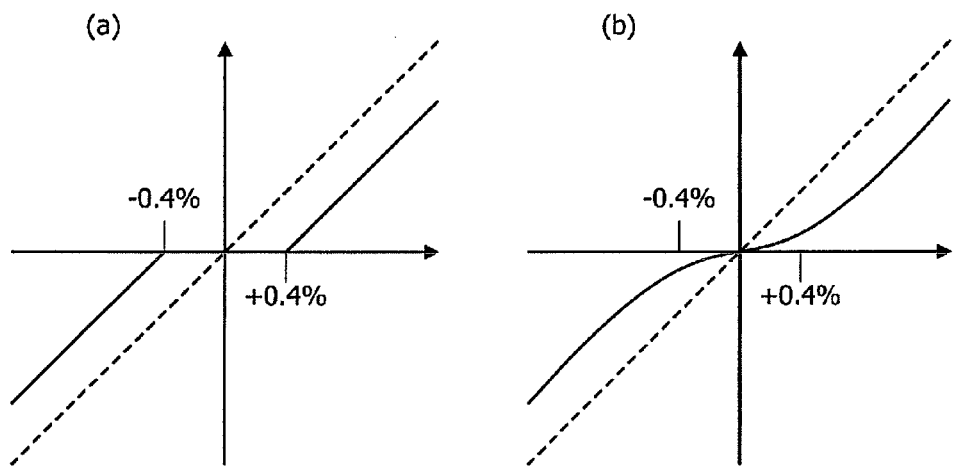
FIG. 18 A characteristics diagram that illustrates an example of noise-suppress non-linear characteristics generated by a non-linear characteristics generation circuit illustrated in FIG. 17.
Figure 21:
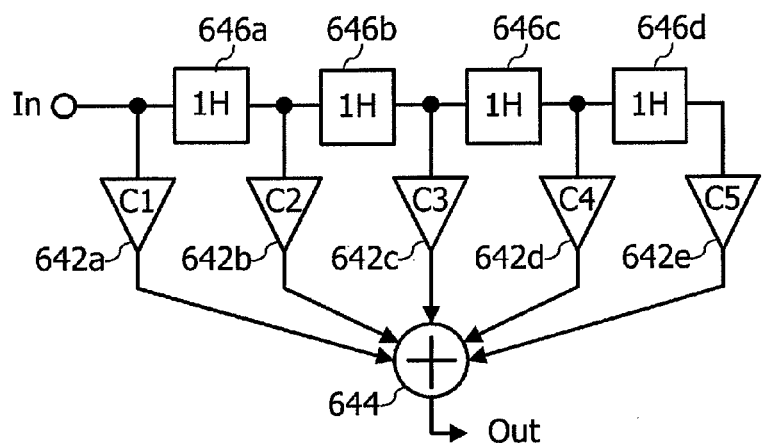
FIG. 21 A block diagram that illustrates the configuration of a vertical low pass filter illustrated in FIG. 19.
Figure 22:
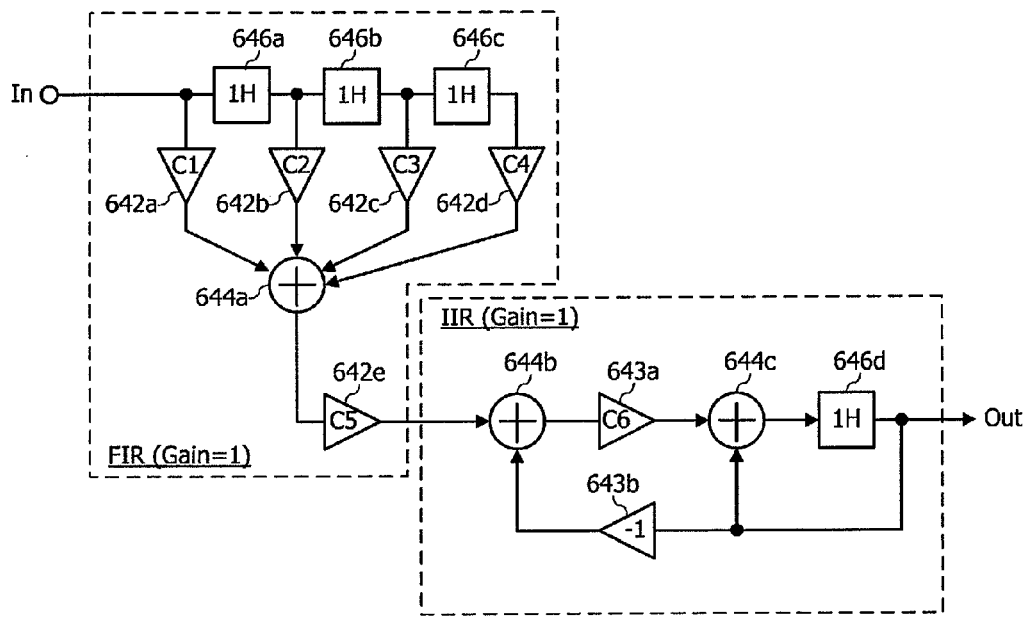
FIG. 22 A block diagram that illustrates an example of the configuration of the vertical low pass filter illustrated in FIG. 19 in which an FIR low pass filter and an IIR low pass filter are connected in cascade.
Figure 23:
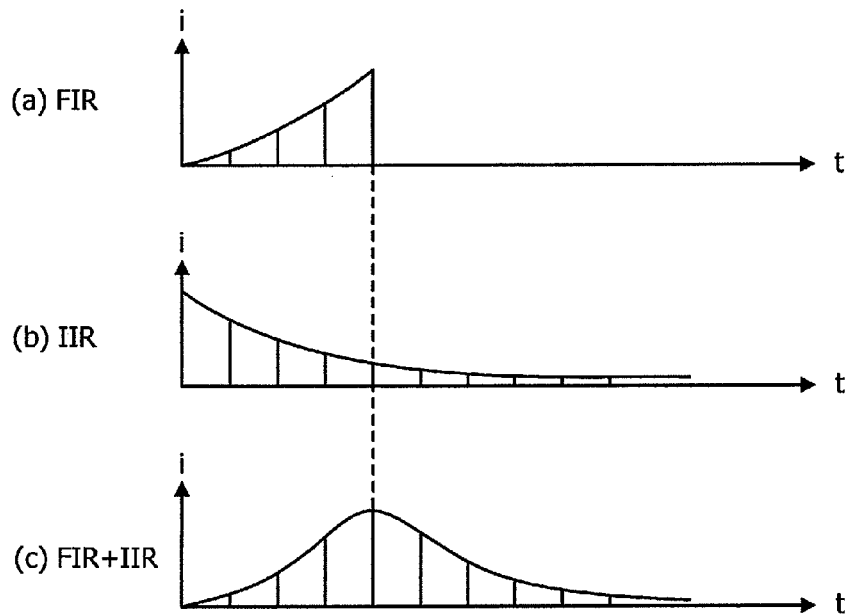
FIG. 23 A timing chart that illustrates an example of impulse response of the vertical low pass filter illustrated in FIG. 22.
Figure 24:
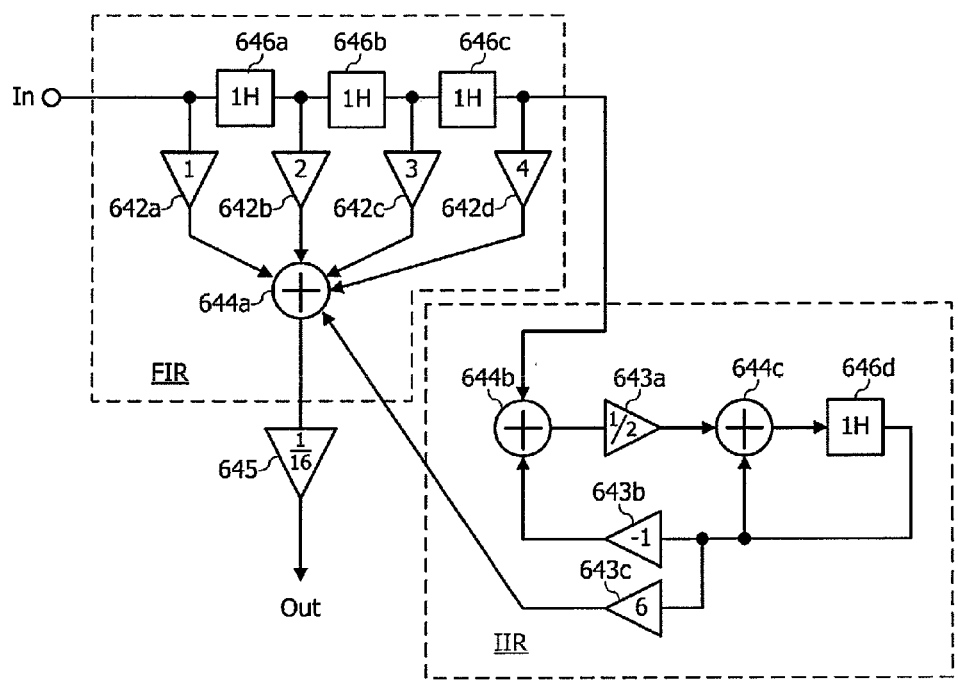
FIG. 24 A block diagram that illustrates an example of the configuration of the vertical low pass filter illustrated in FIG. 19 in which an FIR low pass filter and an IIR low pass filter are connected in parallel.
Figure 29:
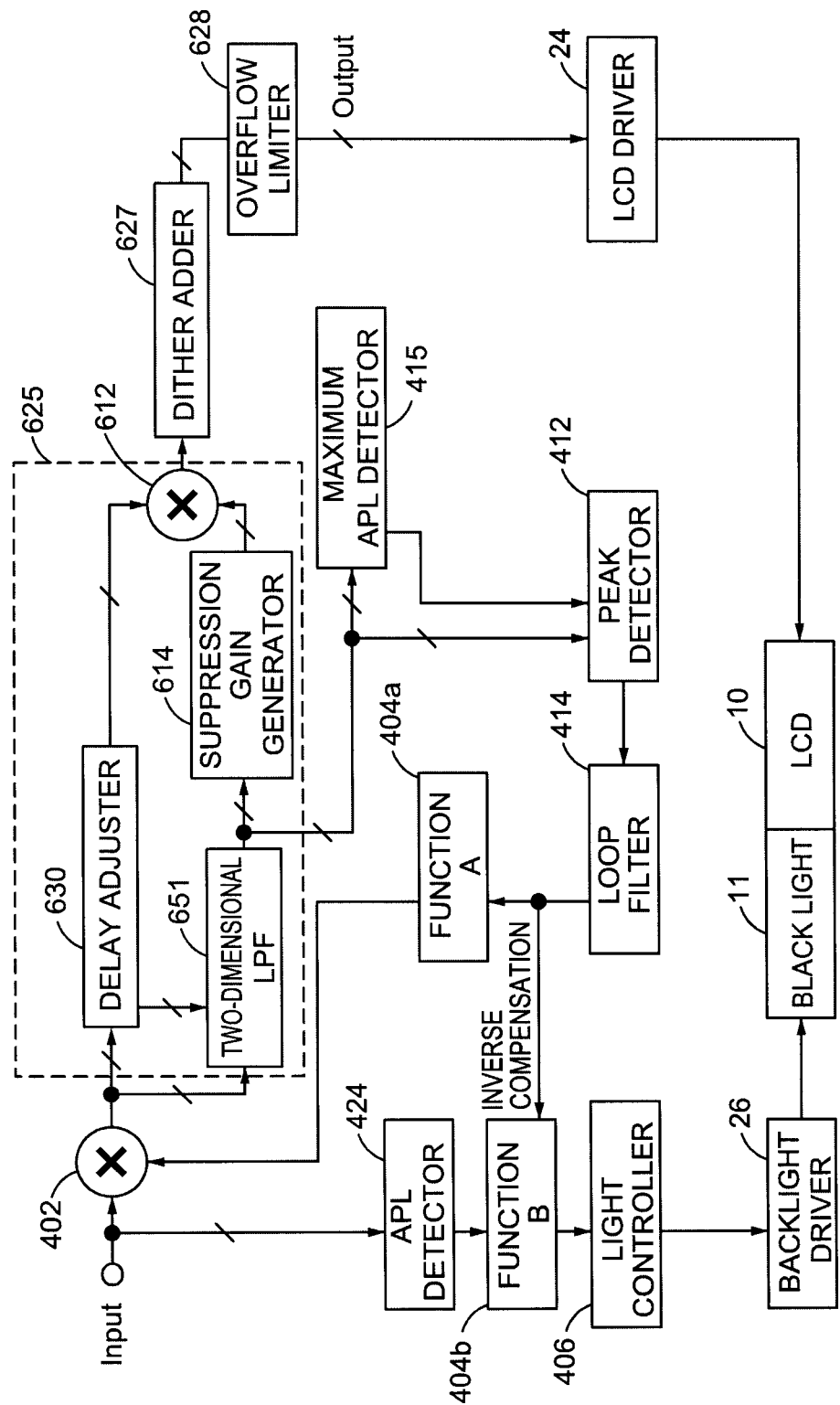
FIG. 29 A block diagram that illustrates a configuration in which a suppressor function and liquid crystal backlight cooperative control are combined.
Figure 30:
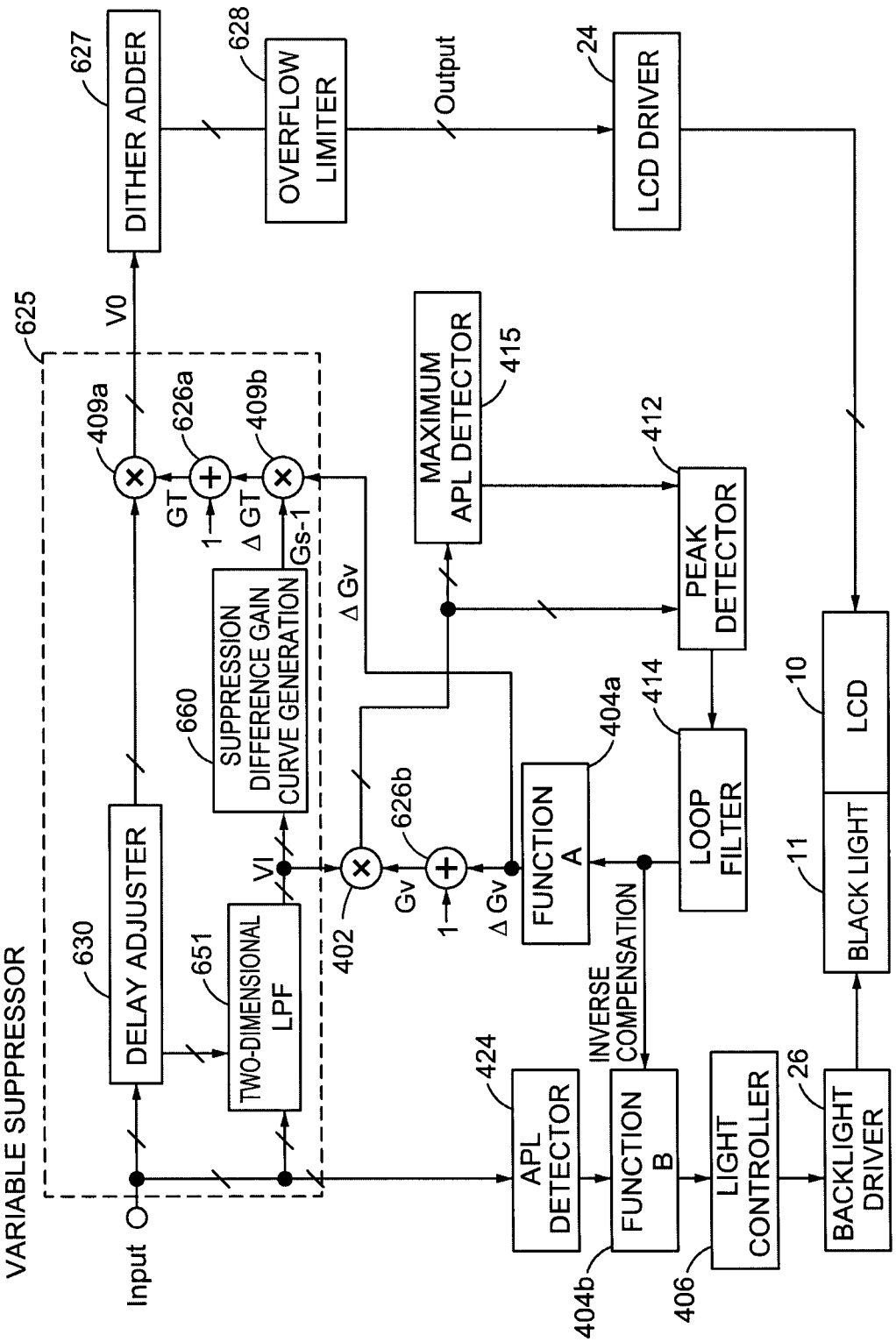
FIG. 30 A block diagram that illustrates a first example of the configuration of a variable suppressor.
Figure 31:
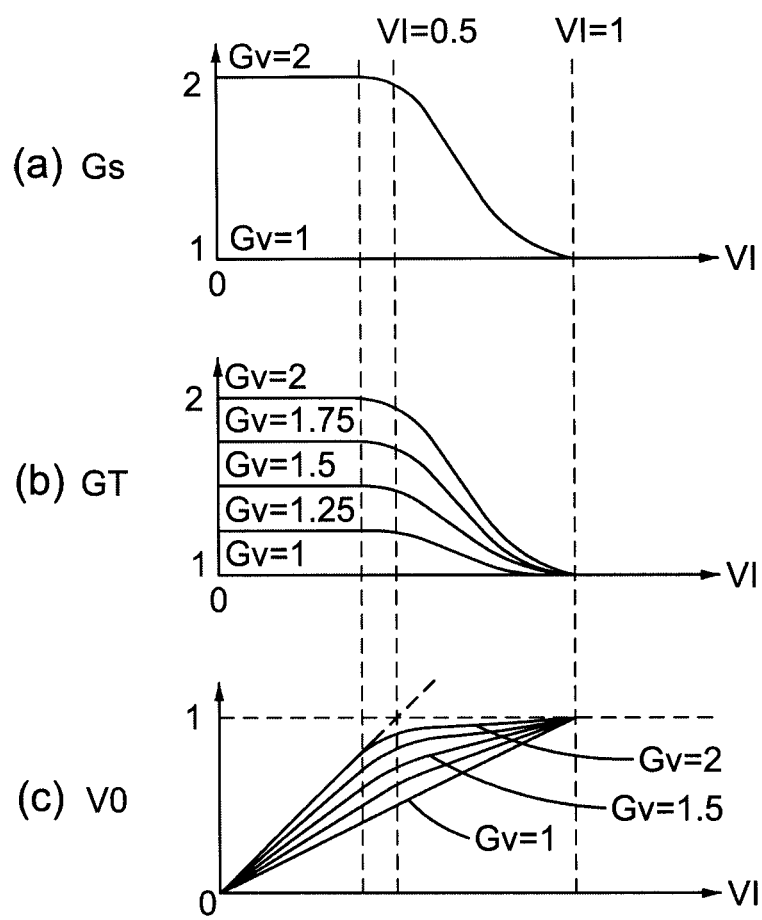
FIG. 31 A graph that illustrates the characteristics of the variable suppressor illustrated in FIG. 30.
Figure 32:
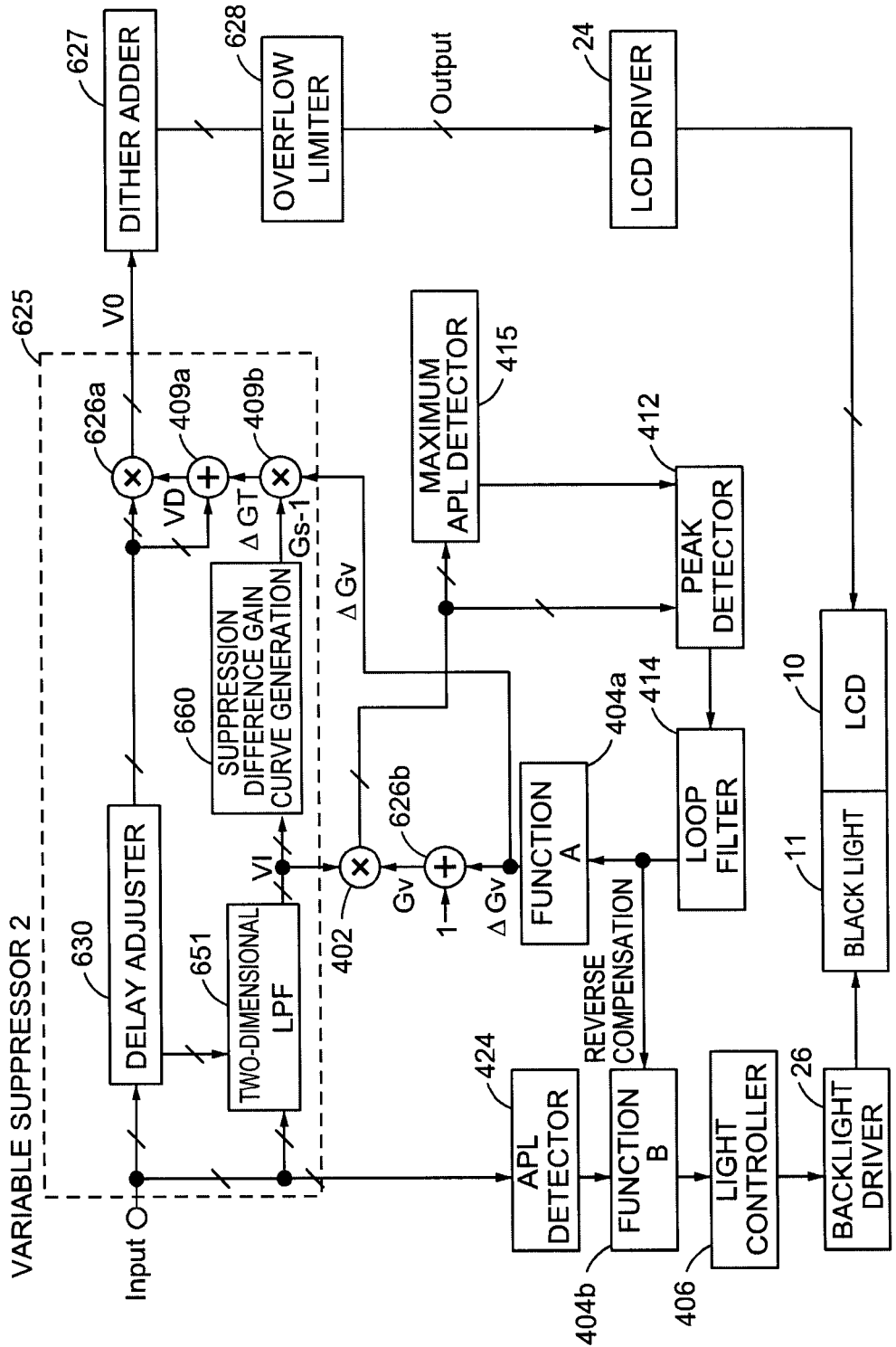
FIG. 32 A block diagram that illustrates an example of generating a final video output by variably mixing video outputs corresponding to a plurality of prepared suppression gain curves depending on a required video gain instead of mixing a plurality of suppress outputs.
Figure 33:
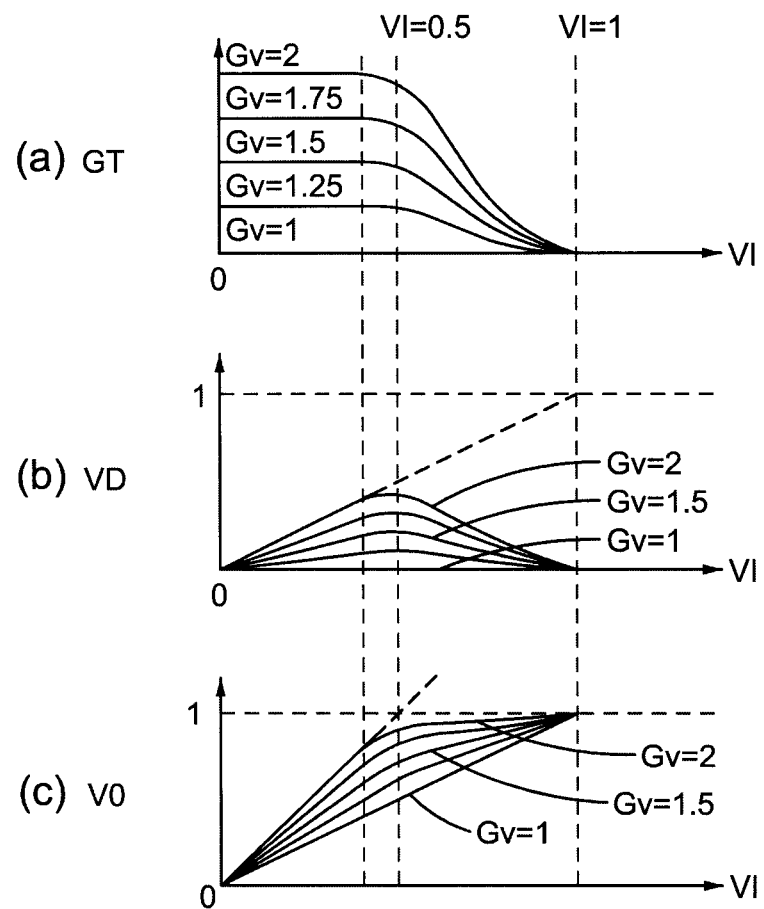
FIG. 33 A graph that illustrates the characteristics of the variable suppressor illustrated in FIG. 32.
Figure 34:
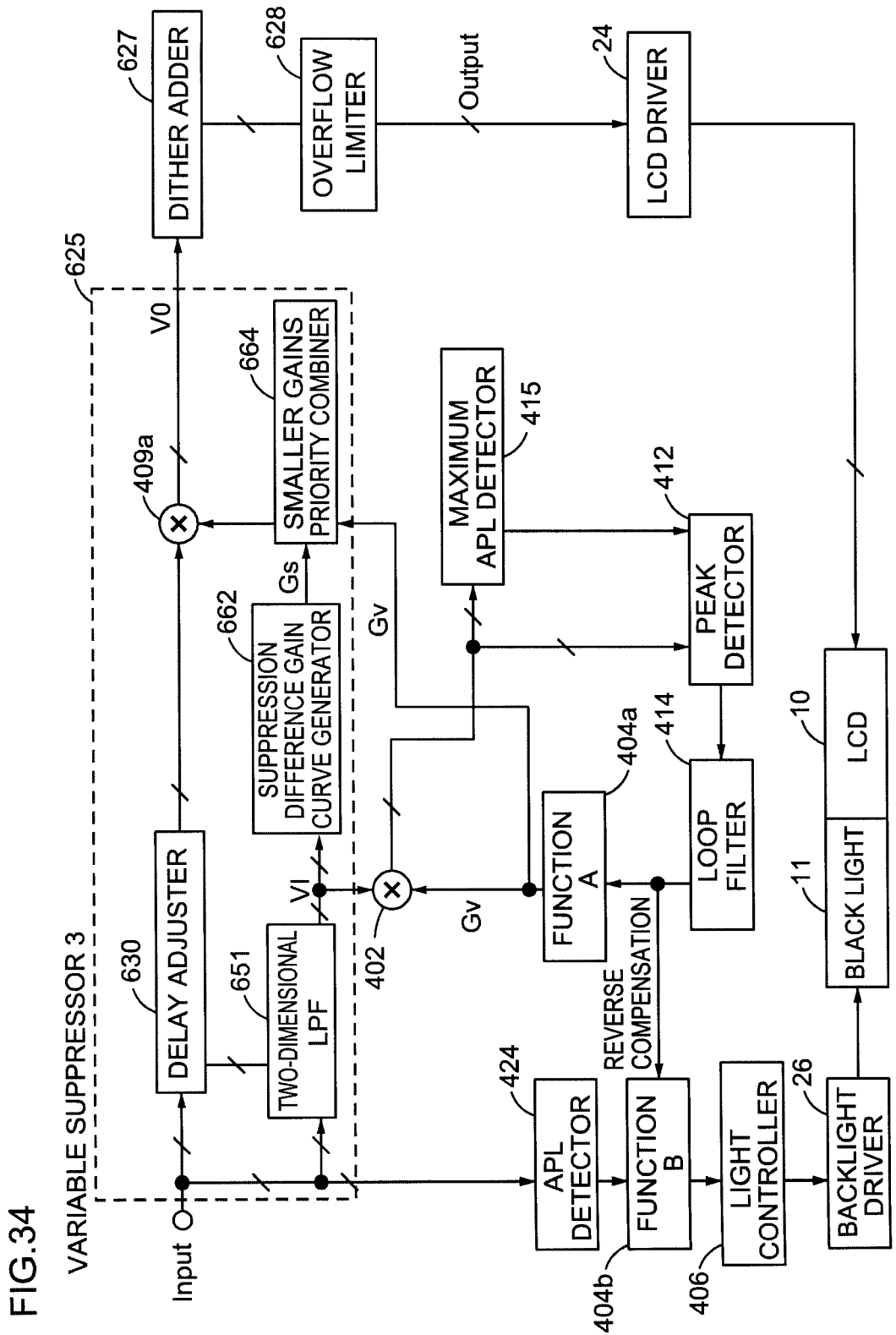
FIG. 34 A block diagram that illustrates a configuration example in which a fixed suppression gain and a video gain are subjected to smaller gain combination to generate a total gain.
Figure 35:
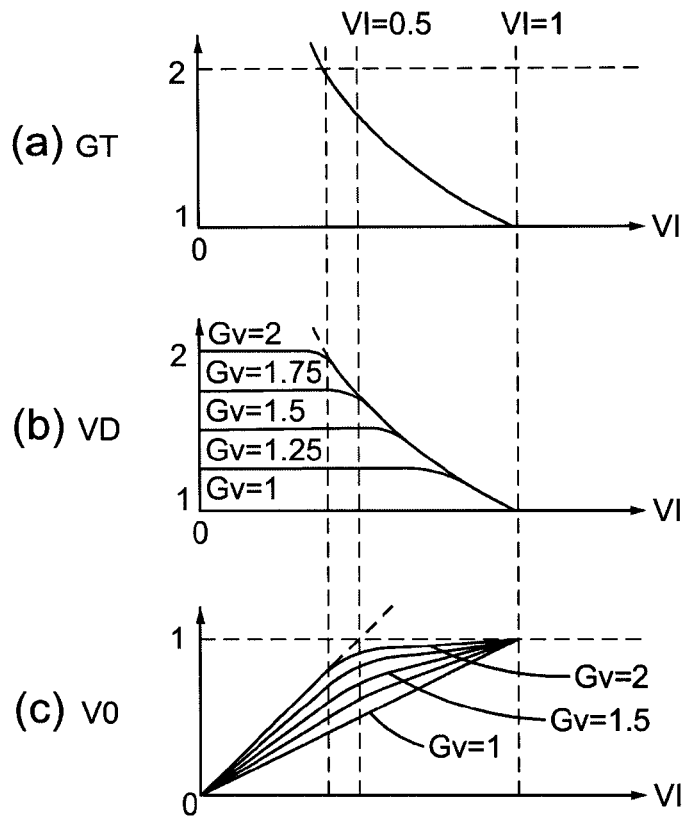
FIG. 35 A graph that illustrates the characteristics of the variable suppressor illustrated in FIG. 34.
Figure 36:
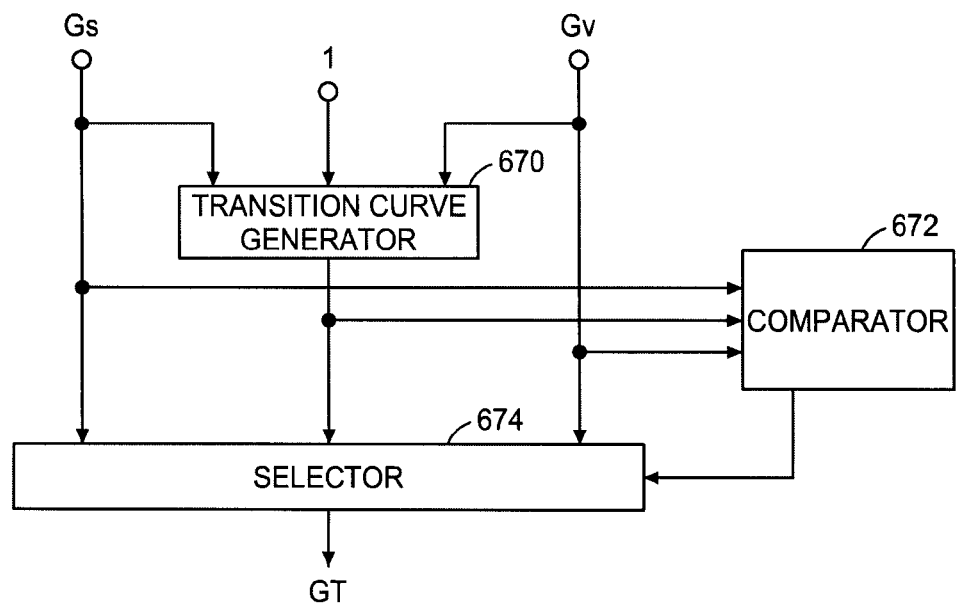
FIG. 36 A block diagram that illustrates the configuration of a smaller gains priority combiner illustrated in FIG. 34.
Figure 37:
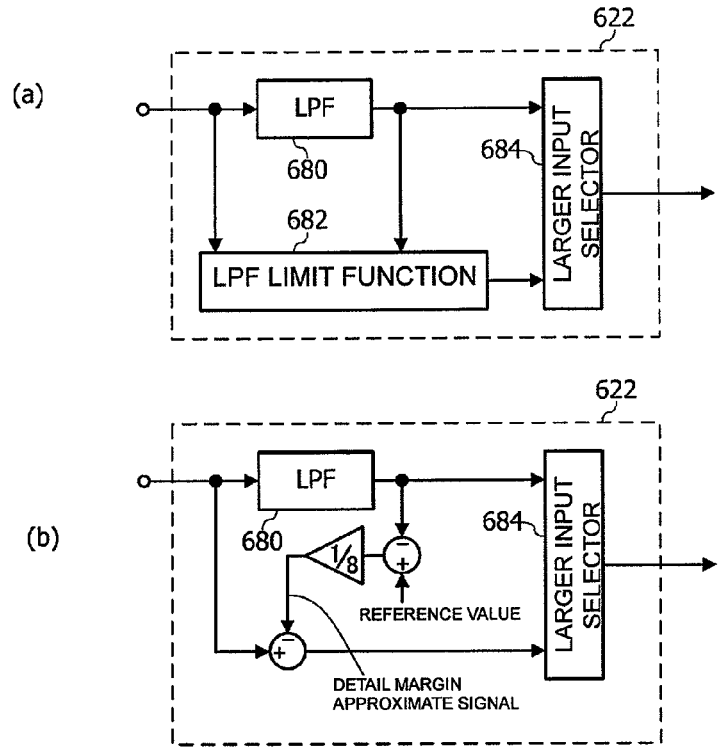
FIG. 37 A block diagram that illustrates a configuration example of a detail upper limit function.
Figure 38:
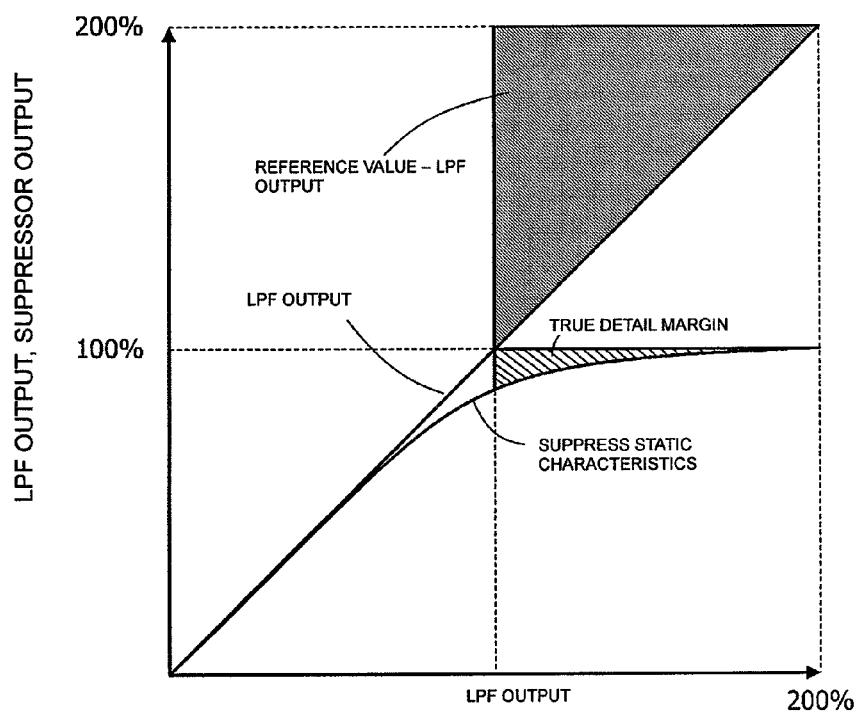
FIG. 38 A diagram for explaining the generation of a detail margin approximate signal using the upper limit function illustrated in FIG. 37.

Reference Numerals
10 liquid crystal panel
11 backlight
24 liquid crystal driver
26 backlight driver
402 gain adjustment/expansion unit
404 function unit
406 light control unit
409 multiplier
410 overflow limiter
412 peak detection unit
414 loop filter
415 maximum APL detection unit
601 overflow detection circuit
602 multiplexer
604 conversion table
606 maximum value detection circuit
608 digit shifter
610 subtracter
612 multiplier
614 suppression gain generation unit
616 level judgment circuit
620 high pass filter
622 low pass filter
623 delay adjustment circuit
624 balanced suppressor
625 detail ratio keep balanced suppressor
626 adder
627 dither addition circuit
628 overflow limiter
630 delay adjustment circuit
632 horizontal low pass filter
634 vertical low pass filter
636 noise suppression curve generation circuit
638 non-linear characteristics generation circuit
640 1-sample delay flip-flop
642 FIR coefficient gain multiplier
643 IIR coefficient gain multiplier
644 adder
645 gain adjustment multiplier
646 1-line delay memory
648 maximum value selection circuit
650 two-dimensional linear low pass filter
651 two-dimensional low pass filter
652 two-dimensional maximum value filter
654 delay adjustment circuit
660 suppress difference gain curve generation unit
662 suppression gain curve unit
664 smaller gains priority combiner
670 transition curve generation unit
672 comparator
674 selector
680 low pass filter
682 low pass filter limit function
684 larger input selection circuit
700 video processing unit
702 display element

The invention claimed is:

1. A video display apparatus that performs video display by controlling a display element on the basis of a video signal composed of a plurality of primary color signals, comprising:
means for separating the video signal into a fundamental waveform and a detail waveform;
means for generating a suppression gain on the basis of the fundamental waveform;
means for applying the suppression gain to the fundamental waveform;
means for mixing the fundamental waveform after the application of the suppression gain with the detail waveform; and
means for controlling the display element on the basis of an output signal obtained as a result of the mixing.

2. The video display apparatus according claim 1, wherein the means for separating the video signal into the fundamental waveform and the detail waveform or the means for separating the fundamental waveform out of the video signal includes a two-dimensional filter that extracts the fundamental waveform containing both a horizontal direction component and a vertical direction component of the video signal.

3. The video display apparatus according to claim 2, wherein the two-dimensional filter includes a vertical filter for extracting the vertical direction component; and
the vertical filter includes an FIR filter and an IIR filter that are connected in cascade or in parallel.

4. The video display apparatus according to claim 2, wherein the two-dimensional filter includes a vertical filter for extracting the vertical direction component; and
the vertical filter is a logical filter that includes maximum value selecting means.

5. The video display apparatus according to claim 2, wherein the two-dimensional filter includes means for mixing an output of a linear low pass filter and an output of a logical filter that includes maximum value selecting means.

6. The video display apparatus according to claim 2, wherein the two-dimensional filter includes means for mixing an output of a linear low pass filter and an output of a delay adjustment circuit that allows an input to pass through as it is.

7. A video display apparatus that performs video display by controlling a display element on the basis of a video signal composed of a plurality of primary color signals, comprising:
means for separating a fundamental waveform out of the video signal;
means for generating a suppression gain on the basis of the fundamental waveform;
means for applying the suppression gain to the video signal before the separation; and
means for controlling the display element on the basis of an output signal after the application of the suppression gain.

8. The video display apparatus according to any of claim 7, wherein the fundamental-waveform separating means performs functional processing on an input signal and an output signal of a low pass filter provided therein to output a functional processing result.

9. The video display apparatus according to claim 8, wherein the functional processing is processing for estimating an overflow margin of the output signal and preferentially outputting the input of the low pass filter depending on degree thereof when there is no overflow margin or the overflow margin is small or preferentially outputting the output of the low pass filter when the overflow margin is large.

10. The video display apparatus according to claim 8, wherein the functional processing is processing for estimating an overflow margin of the output signal, comparing a value obtained by subtracting the overflow margin from the input of the low pass filter with the output of the low pass filter, and outputting the larger one.

11. A video display apparatus that performs video display by controlling a display element on the basis of a video signal composed of a plurality of primary color signals, comprising:
    means for separating the video signal into a fundamental waveform and a detail waveform;
    means for generating a suppression gain on the basis of the fundamental waveform;
    means for outputting, as an output signal, either a signal obtained by applying the suppression gain to each of the fundamental waveform and the detail waveform and then mixing the fundamental waveform after the application of the suppression gain with the detail waveform after the application of the suppression gain or a signal obtained by mixing the fundamental waveform with the detail waveform and then applying the suppression gain to the signal obtained by the mixing; and
    means for controlling the display element on the basis of the output signal of the outputting means.

12. The video display apparatus according to claim 11, further comprising means for lowering a gain of the detail waveform when a level of the detail waveform or the video signal is low.

13. The video display apparatus according to claim 11, further comprising means for applying dead-zone characteristics to the detail waveform when a level of the detail waveform is low.

14. A video display apparatus that performs video display by controlling light emitted out of a light source on the basis of an input video signal by means of a plurality of display elements, comprising:
    means for separating the video signal into a fundamental waveform and a detail waveform;
    means for detecting a brightness peak: of the video signal;
    means for detecting an error with respect to a target value of the brightness peak;
    means for determining a modulation gain of the display elements on the basis of the error;
    means for controlling amount of light emitted out of the light source through reverse compensation of the error;
    means for generating a suppression gain on the basis of the modulation gain and a level of the video signal;
    means for applying the suppression gain to the video signal; and
    means for controlling the display elements on the basis of a video signal after the application of the suppression gain.

15. The video display apparatus according to claim 14, wherein the means for generating the suppression gain mix-outputs a plurality of suppress curves prepared in advance depending on the modulation gain.

16. The video display apparatus according to claim 14, wherein the means for generating the suppression gain compares a suppress curve prepared in advance with the modulation gain and selectively outputs the smaller one found as a result of the comparison.

* * * * *